US009696722B1

(12) United States Patent
Ulrich et al.

(10) Patent No.: US 9,696,722 B1
(45) Date of Patent: *Jul. 4, 2017

(54) LIGHT STEERING DEVICE WITH AN ARRAY OF OSCILLATING REFLECTIVE SLATS

(71) Applicant: Waymo LLC, Mountain View, CA (US)

(72) Inventors: Drew Ulrich, San Francisco, CA (US); Pierre-yves Droz, Mountain View, CA (US); Samuel Lenius, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/813,320

(22) Filed: Jul. 30, 2015

Related U.S. Application Data

(63) Continuation of application No. 14/090,485, filed on Nov. 26, 2013.

(60) Provisional application No. 61/773,573, filed on Mar. 6, 2013.

(51) Int. Cl.
*G01C 3/08* (2006.01)
*G01S 17/93* (2006.01)
*G02B 26/08* (2006.01)
*G02B 26/10* (2006.01)
*G05D 1/02* (2006.01)

(52) U.S. Cl.
CPC .......... *G05D 1/0231* (2013.01); *G01S 17/936* (2013.01)

(58) Field of Classification Search
CPC G02B 26/0833; G02B 26/0825; G02B 26/08; G02B 26/105; G01S 17/936

USPC .............. 356/5.01; 359/196.1, 201.2, 223.1; 701/28; 342/70

See application file for complete search history.

(56) References Cited

U.S. PATENT DOCUMENTS

| 3,790,277 | A | | 2/1974 | Hogan |
| 4,700,301 | A | | 10/1987 | Dyke |
| 4,709,195 | A | | 11/1987 | Hellekson et al. |
| 5,202,742 | A | | 4/1993 | Frank et al. |
| 5,359,413 | A | * | 10/1994 | Chang .................... G01C 19/70 356/469 |
| 5,451,787 | A | | 9/1995 | Taylor |

(Continued)

OTHER PUBLICATIONS

Hogan, Matthew; EIC 3600 STIC Search Report; Jan. 20, 2016.*

*Primary Examiner* — Redhwan k Mawari
*Assistant Examiner* — Alan D Hutchinson
(74) *Attorney, Agent, or Firm* — McDonnell Boehnen Hulbert & Berghoff LLP

(57) ABSTRACT

A light detection and ranging (LIDAR) device scans through a scanning zone while emitting light pulses and receives reflected signals corresponding to the light pulses. The LIDAR device scans the emitted light pulses through the scanning zone by reflecting the light pulses from an array of oscillating mirrors. The mirrors are operated by a set of electromagnets arranged to apply torque on the mirrors, and an orientation feedback system senses the orientations of the mirrors. Driving parameters for each mirror are determined based on information from the orientation feedback system. The driving parameters can be used to drive the mirrors in phase at an operating frequency despite variations in moments of inertia and resonant frequencies among the mirrors.

20 Claims, 12 Drawing Sheets

(56) References Cited

U.S. PATENT DOCUMENTS

| | | |
|---|---|---|
| 6,388,789 B1 | 5/2002 | Bernstein |
| 6,738,583 B1 | 5/2004 | Matta et al. |
| 6,839,127 B1 | 1/2005 | Anderson |
| 7,089,114 B1 | 8/2006 | Huang |
| 7,248,342 B1 | 7/2007 | Degnan |
| 7,255,275 B2 | 8/2007 | Gurevich et al. |
| 7,697,180 B2 | 4/2010 | Nakajima |
| 7,969,558 B2 | 6/2011 | Hall |
| 9,128,190 B1 | 9/2015 | Ulrich et al. |
| 2009/0015891 A1 | 1/2009 | Kane |
| 2010/0165322 A1 | 7/2010 | Kane et al. |
| 2010/0165323 A1 | 7/2010 | Fiess et al. |

\* cited by examiner

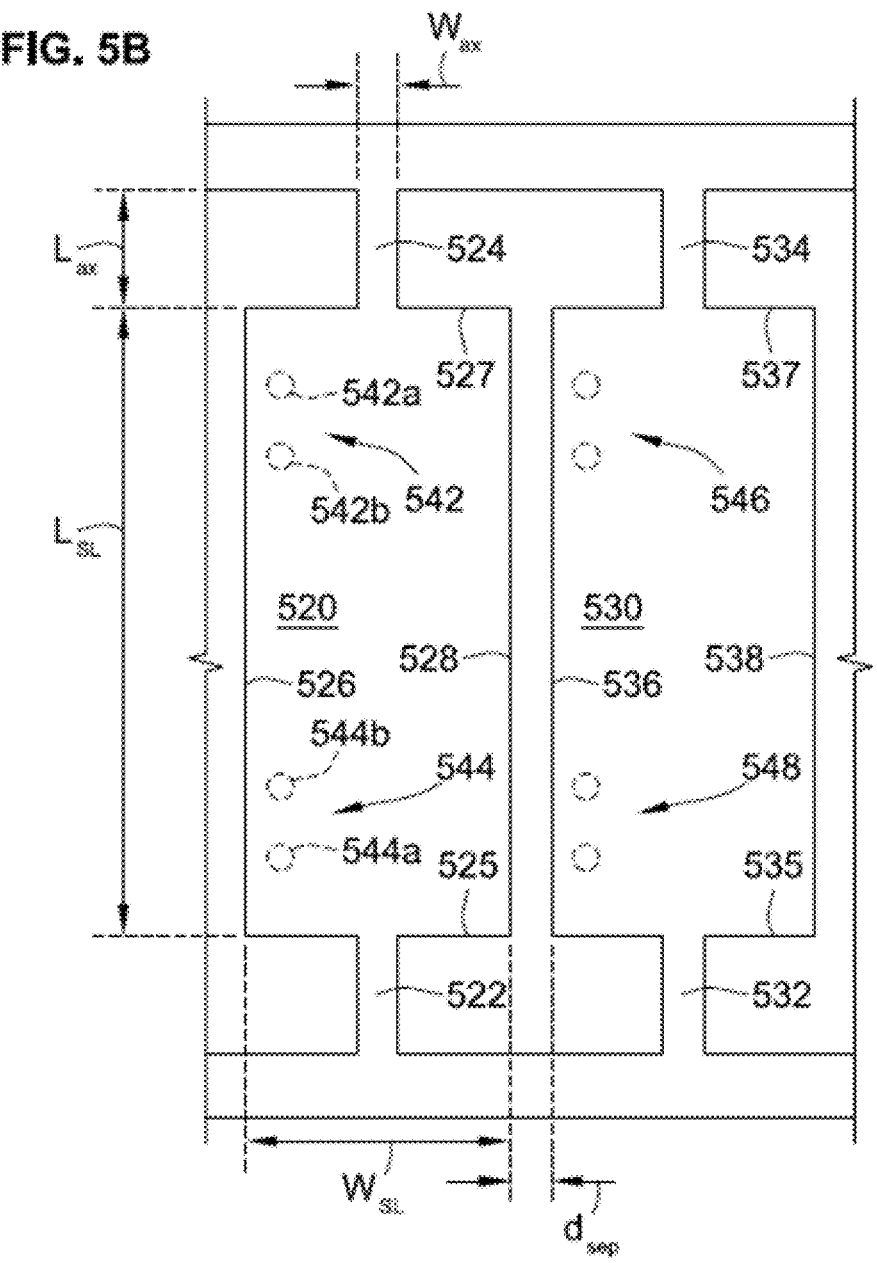
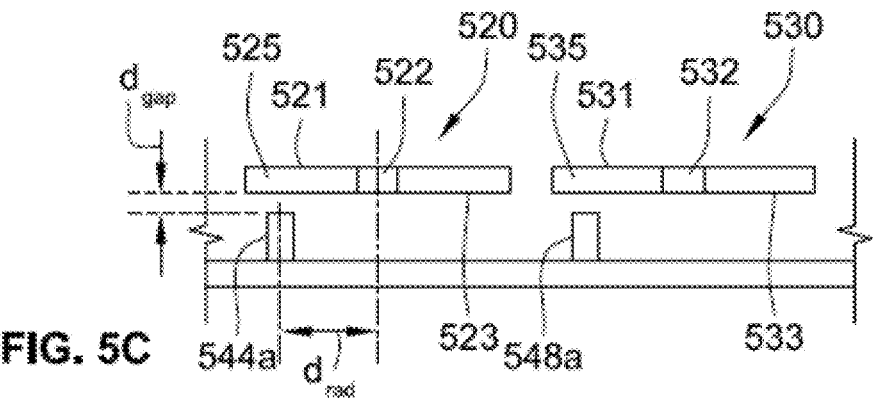

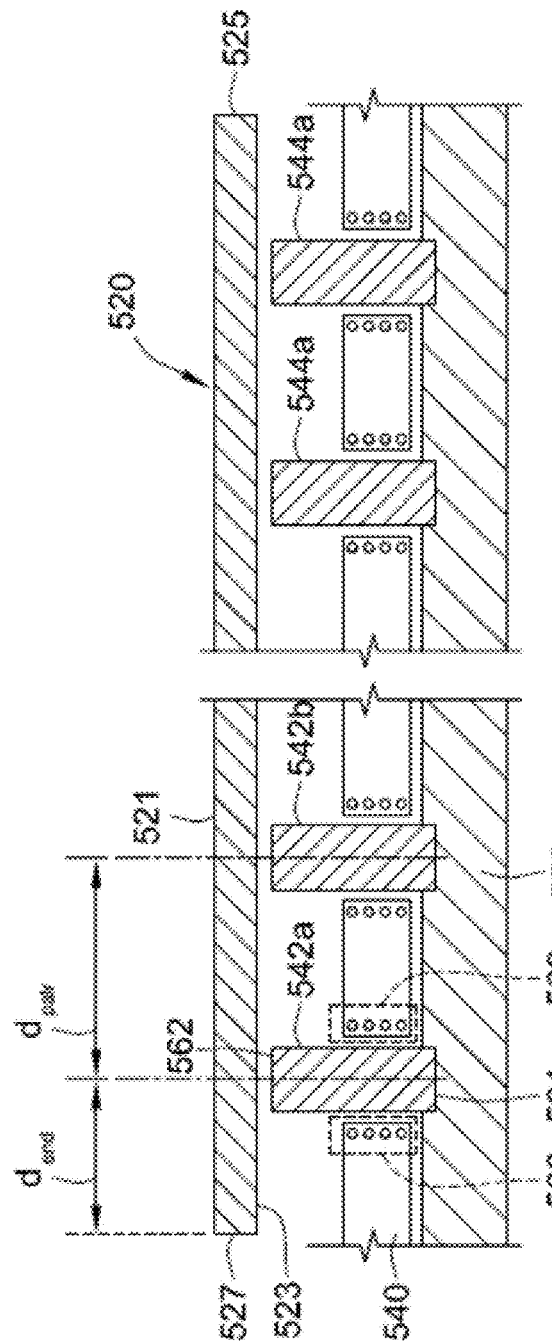
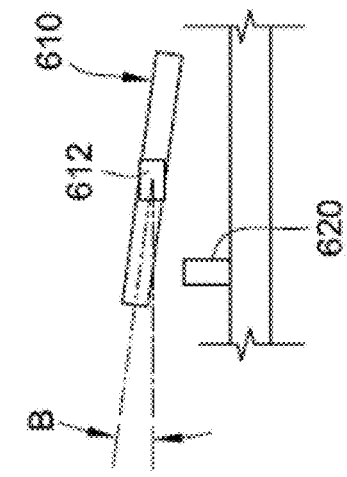
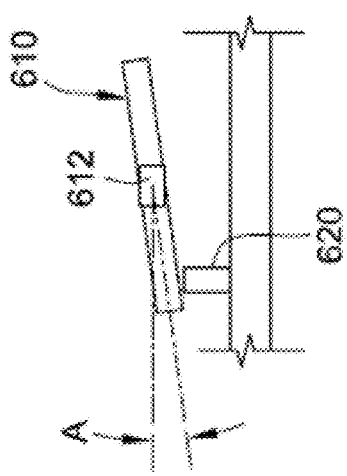
FIG. 5D
FIG. 6A   FIG. 6B   FIG. 6C

LIGHT STEERING DEVICE WITH AN ARRAY OF OSCILLATING REFLECTIVE SLATS

CROSS-REFERENCE TO RELATED APPLICATIONS

This application is a continuation of U.S. patent application Ser. No. 14/090,485, filed Nov. 26, 2013, which claims priority to U.S. Provisional Patent Application No. 61/773,573, filed Mar. 6, 2013. These applications are incorporated herein by reference in their entirety and for all purposes.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

SUMMARY

A beam-steering device for a light detection and ranging (LIDAR) device is disclosed. The LIDAR device scans through a scanning zone while emitting light pulses and receives reflected signals corresponding to the light pulses. The emitted light pulses are scanned through the scanning zone by reflecting the light from an array of oscillating mirrors. The mirrors are driven by a set of electromagnets arranged to apply torque on the mirrors, and an orientation feedback system senses the orientations of the mirrors. Driving parameters for each mirror are determined based on information from the orientation feedback system. The drying parameters can be used to drive the mirrors in phase at an operating frequency despite variations in moments of inertia and resonant frequencies among the mirrors.

Some embodiments of the present disclosure provide a light detection and ranging (LIDAR) device. The LIDAR device can include a plurality of mirrors arranged to rotate about respective axes of rotation parallel to a reflective surface of the respective mirrors. The axes of rotation of the plurality of mirrors can be arranged to be aligned in parallel and in a common plane. The LIDAR device can include a plurality of electromagnets arranged to attract the plurality of mirrors via induced magnetic fields generated in the mirrors so as to apply torque on the respective mirrors about their respective axes of rotation. Each of the plurality of electromagnets can be arranged to apply torque to only one of the plurality of mirrors such that each of the plurality of mirrors is associated with a mirror-associated set of electromagnets in the plurality of electromagnets. The LIDAR device can include a plurality of driving circuits for operating the plurality of electromagnets using a plurality of driving signals. Each driving circuit can be configured to receive a respective input and generate, based on the respective input, a respective driving signal for operating a respective mirror-associated set of electromagnets. The LIDAR device can include a plurality of detectors configured to detect orientations of the plurality of mirrors. The LIDAR device can include a controller configured to: (i) receive data from the plurality of detectors indicative of detected orientations of the plurality of mirrors, (ii) determine, based on the detected orientations, driving parameters sufficient to cause the plurality of driving circuits to operate the plurality of electromagnets such that the plurality of mirrors oscillate in phase at an operating frequency, and (iii) provide the determined driving parameters as input to the plurality of driving circuits. The LIDAR device can include a light source configured to emit light pulses directed toward the plurality of mirrors such that the light pulses are reflected by the plurality of mirrors.

Some embodiments of the present disclosure provide a method. The method can include operating a plurality of sets of mirror-associated electromagnets such that each set of mirror-associated electromagnets is operated by a respective driving circuit in a plurality of driving circuits based on respective input. Each set of mirror-associated electromagnets can be configured to apply torque to a respective mirror in a plurality of mirrors so as to cause the respective mirror to rotate about a respective axis of rotation parallel to a reflective surface of the respective mirror. The plurality of mirrors can have axes of rotation aligned in parallel and in a common plane. The method can include receiving, from a plurality of detectors configured to detect orientations of the plurality of mirrors, data indicative of detected orientations of the plurality of mirrors. The method can include determining, based on the detected orientations, driving parameters sufficient to cause the plurality of driving circuits to operate the plurality of electromagnets such that the plurality of mirrors oscillate in phase at an operating frequency. The method can include providing the determined driving parameters as input to the plurality of driving circuits.

Some embodiments of the present disclosure provide a non-transitory computer readable medium storing instructions that, when executed by one or more processors in a computing device, cause the computing device to perform operations. The operations can include operating a plurality of sets of mirror-associated electromagnets such that each set of mirror-associated electromagnets is operated by a respective driving circuit in a plurality of driving circuits based on respective input. Each set of mirror-associated electromagnets can be configured to apply torque to a respective mirror in a plurality of mirrors so as to cause the respective mirror to rotate about a respective axis of rotation parallel to a reflective surface of the respective mirror. The plurality of mirrors can have axes of rotation aligned in parallel and in a common plane. The operations can include receiving, from a plurality of detectors configured to detect orientations of the plurality of mirrors, data indicative of detected orientations of the plurality of mirrors. The operations can include determining, based on the detected orientations, driving parameters sufficient to cause the plurality of driving circuits to operate the plurality of electromagnets such that the plurality of mirrors oscillate in phase at an operating frequency. The operations can include providing the determined driving parameters as input to the plurality of driving circuits.

Some embodiments of the present disclosure provide a means for oscillating a plurality of mirrors such that the plurality of mirrors oscillate in phase at an operating frequency.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5B is a top view of the example beam-steering device shown in FIG. 5A.

FIG. 5C is an end view of the example beam-steering device shown in FIG. 5A.

FIG. 5D is a cross-sectional side view of one of the reflective slats that shows example electromagnets associated with the reflective slat.

FIG. 6A is an end view of a reflective slat oriented in a nominal position, according to an example embodiment.

FIG. 6B is an end view of a reflective slat oriented in a rotated position due to attraction between the slat and an electromagnet, according to an example embodiment.

FIG. 6C is an end view of the reflective slat oriented in a second rotated position due to the reflexive torque applied by the connecting arm, according to an example embodiment.

DETAILED DESCRIPTION

Figure 1:
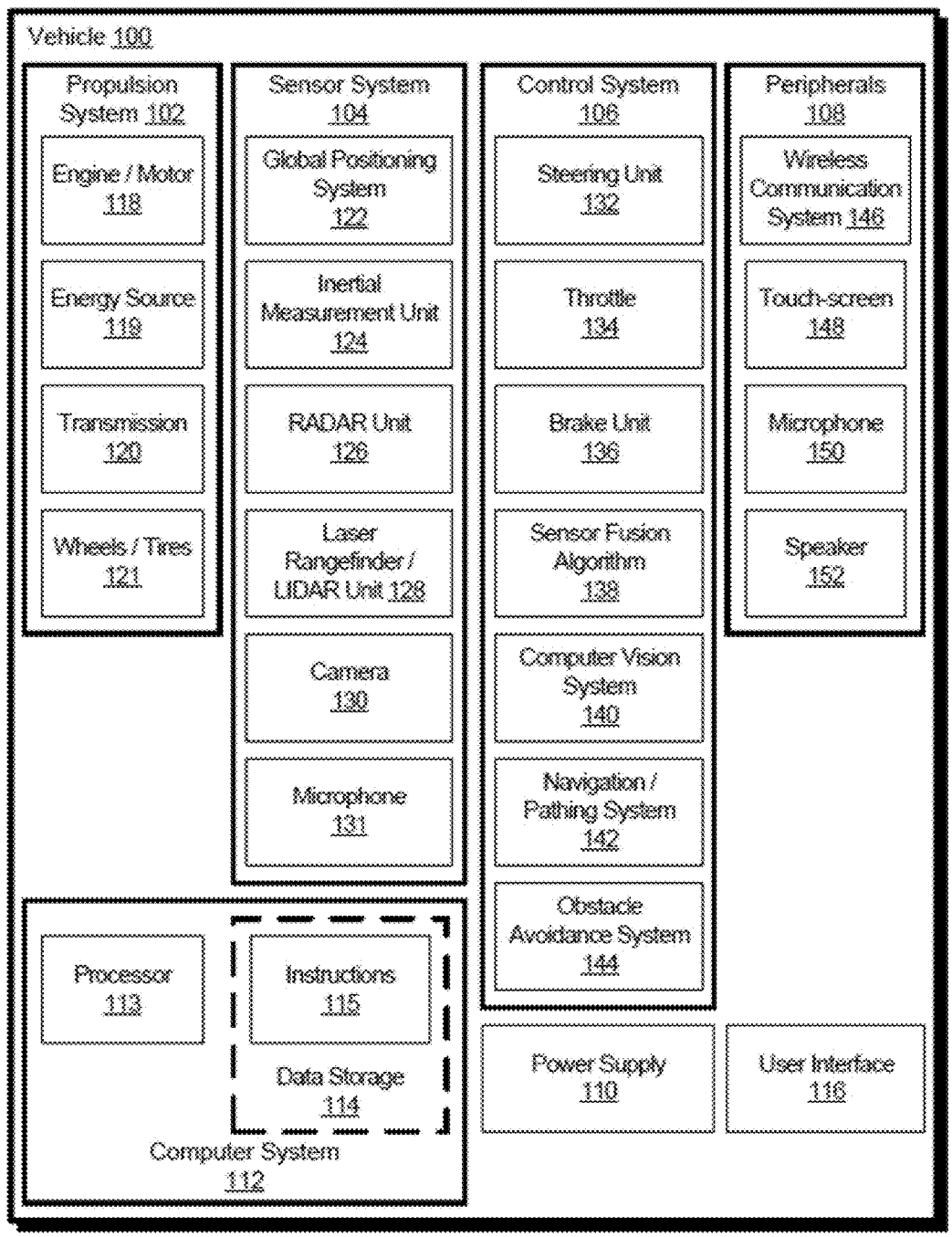
FIG. 1 is a functional block diagram depicting aspects of an example autonomous vehicle.

Example embodiments relate to an autonomous vehicle, such as a driverless automobile, that includes a light detection and ranging (LIDAR) sensor for actively detecting reflective features in the environment surrounding the vehicle. A controller analyzes information from the LIDAR sensor to identify the surroundings of the vehicle. Each distance measurement of a scanning LIDAR is associated with a point or "spot" on a reflective feature. Scanning the LIDAR through a range of orientations provides a three-dimensional distribution of reflective points, which is referred to herein as a 3-D point map or 3-D point cloud.

According to some embodiments, a LIDAR device includes one or more pulsing lasers directed toward an array of oscillating mirrors. The individual mirrors are each smaller than the cross-section of a single incident laser beam, but are spaced closely such that incident laser beams are jointly reflected by a plurality of the mirrors. The mirrors are driven to oscillate in phase such that a laser beam pulse reflected by the array of mirrors is substantially reflected all in the same direction. Oscillating the array of mirrors directs the pulses of laser light to scan across a scanning zone surrounding the LIDAR device. The emitted pulses of laser light are then reflected by the environmental surroundings and the reflected light is detected by a light sensor associated with the LIDAR. The time delay between emitting the pulse of laser light and receiving the returning reflected signal provides an indication of the distance to a reflective feature, while the orientation of the mirrors in the array of mirrors indicates the direction to the reflective feature.

In contrast to a single solid mirror, an array of mirrors can be oscillated at a much higher frequency than a single large mirror of comparable dimension. In particular, the individual small mirrors in the array have correspondingly small moments of inertia. Thus, the array of mirrors can span a region of about 3 centimeters by 5 centimeters and may be driven at a frequency of 5 kilohertz, for example, without significant mechanical deformation to the reflective surfaces. The individual mirrors can be driven to oscillate so as to scan reflected light through an approximately 2 degree range of orientations (e.g., by oscillating plus or minus 1 degree).

The individual mirrors in the array can be driven by oscillating electromagnetic forces. For example, each mirror can be formed of a ferromagnetic material, such as steel or another suitable metal, and electromagnets can be situated near the back, opposite the reflective surface of the mirror, and close to a side edge distant from the axis of rotation of the mirror. Energizing the electromagnets induces a magnetic response in the ferromagnetic material of the mirror to urge the side edge of the mirror toward the electromagnets, thereby rotating the mirror about its axis of rotation and adjusting the orientation of the mirror. Turning off the electromagnets relieves the torque on the mirror. In some instances, one or more matching electromagnets can be situated near the opposing side edge of the mirror to attract the mirror to rotate in the opposite direction following the initial rotation. In some instances, the mirror can be biased in a non-rotated position (e.g., by a damping force such as a rigid axis of rotation, springs, etc.) such that turning off the electromagnets causes the mirror to rotate back toward its non-rotated position. Such a restorative bias may also cause the mirror to over-rotate past its non-rotated position so as to oscillate the mirror in the opposite direction before rotating back toward the electromagnets. Upon the side edge closest to the electromagnets approaching the electromagnets, the electromagnets can be turned on again to attract the mirror in that direction. Repeating the process above can allow the mirror to oscillate.

In one configuration, a plurality of roughly rectangular steel mirrors is suspended over a printed circuit board with their respective reflective surfaces facing away from the printed circuit board. Each mirror can have a rectangular shape with a pair of opposing short sides and a pair of opposing long sides. Each mirror can be suspended over the printed circuit board by narrow strips of metal connected to the midpoints of the short sides. The narrow strips (or connecting arms) connected to a mirror can be integrally formed with that mirror. The connecting arms flex, in a torsional direction, (i.e., twist) to allow the mirrors to rotate about an axis of rotation defined by the connecting arms. Tension in the connecting arms provides a restorative force biasing the mirrors in a flat, non-rotated position where the connecting arms are in an untwisted, relaxed state.

The rectangular mirrors can be arranged with their respective axes of rotation aligned in parallel and oriented in a common plane. Thus, each rectangular mirror can have at least one long side adjacent the long side of a neighboring mirror, with a sufficient separation between neighboring mirrors to avoid interference during oscillation. While driven, the array of mirrors can oscillate with the respective long sides of the respective rectangular mirrors moving up and down with respect to the common plane defined by the axes of rotation.

The mirrors can be oscillated via electromagnets in the printed circuit board located under the array of mirrors. In some examples, pairs of steel pegs extend from the printed circuit board substantially perpendicular to the back surfaces of the mirrors. Each pair of steel pegs terminates proximate the back surface of one of the mirrors near a long side of the mirror and offset from the mirror's axis of rotation. Each peg is surrounded by a conductive coil created by traces in the printed circuit board. Driving current through the traces turns on the electromagnets and the respective pegs are the ferromagnetic cores of the electromagnets. Driving the electromagnets with a periodic current provides a corresponding periodic attractive force between the edges of the mirrors and the pegs to cause the mirrors to oscillate.

In an example, the individual mirrors and connecting arms are cut from a single plate of silicon steel such that the connecting arms connect the mirrors to an outer frame.

Feedback sensors are included to monitor the positions of the individual mirrors and adjust the amplitude and/or phase of the driving signals such that the entire array of mirrors oscillates in phase. In particular, deviations in the amplitude and/or phase of oscillations in individual mirrors may occur due to variations in resonant frequencies and/or moments of inertia among the individual mirrors. The amplitude and phase of the oscillations of the mirrors are each dependent on the inherent resonant frequency and/or moment of inertia of the individual mirrors, which is a function of the precise device parameters (material properties, mass distribution, dimensions, etc.), which may vary somewhat among the mirrors due to manufacturing variations, etc. While the input driving frequency may be fixed across the array, the relative phase and/or amplitude of the electromagnet driving signals for each mirror can be tuned for the electromagnets associated with each mirror to account for variations in resonant frequencies. For example, a microcontroller can evaluate information from the feedback sensors and adjust the phase and/or amplitude of the electromagnet driver signals applied to electromagnets associated with each mirror to compensate for detected phase offsets between mirrors.

The feedback information may be provided by monitoring the impedance between matching pairs of pegs in the electromagnets. The impedance in such a "magnetic circuit" is related to the gap distance between the ends of the pegs and the respective back sides of the mirrors. Thus, monitoring the impedance value provides an indication of the orientation of the mirrors. The feedback information may additionally or alternatively be provided by an optical sensing system that illuminates the mirrors with a light source and detects the light with a photo-sensitive detector in a fixed position to determine the orientation of the mirror.

In example embodiments, the example system may include one or more processors, one or more forms of memory, one or more input devices/interfaces, one or more output devices/interfaces, and machine-readable instructions that when executed by the one or more processors cause the system to carry out the various functions, tasks, capabilities, etc., described above.

Some aspects of the example methods described herein may be carried out in whole or in part by an autonomous vehicle or components thereof. However, some example methods may also be carried out in whole or in part by a system or systems that are remote from an autonomous vehicle. For instance, an example method could be carried out in part or in full by a server system, which receives information from sensors (e.g., raw sensor data and/or information derived therefrom) of an autonomous vehicle. Other examples are also possible.

Example systems within the scope of the present disclosure will now be described in greater detail. An example system may be implemented in, or may take the form of, an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, road way boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, wireless communication system 146 can communicate with a wireless local area network (WLAN), for example, using WiFi. In some embodiments, wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
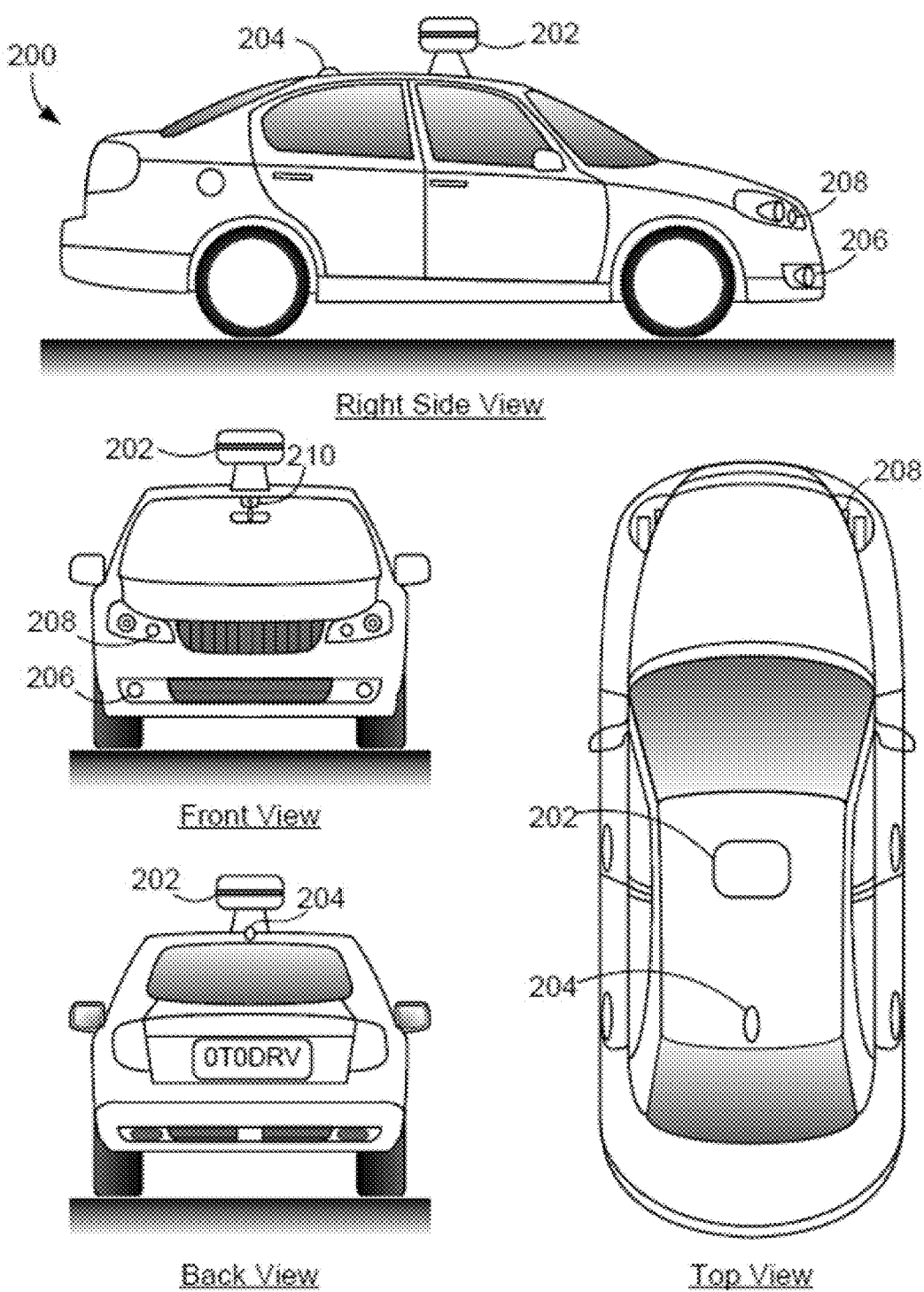
FIG. 2 depicts exterior views of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel sedan-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, a RADAR unit 206, a laser rangefinder unit 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc., that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200.

The camera 210 can have associated optics operable to provide an adjustable field of view. Further, the camera 210 can be mounted to vehicle 200 with a movable mount to vary a pointing angle of the camera 210, such as via a pan/tilt mechanism.

Figure 3:
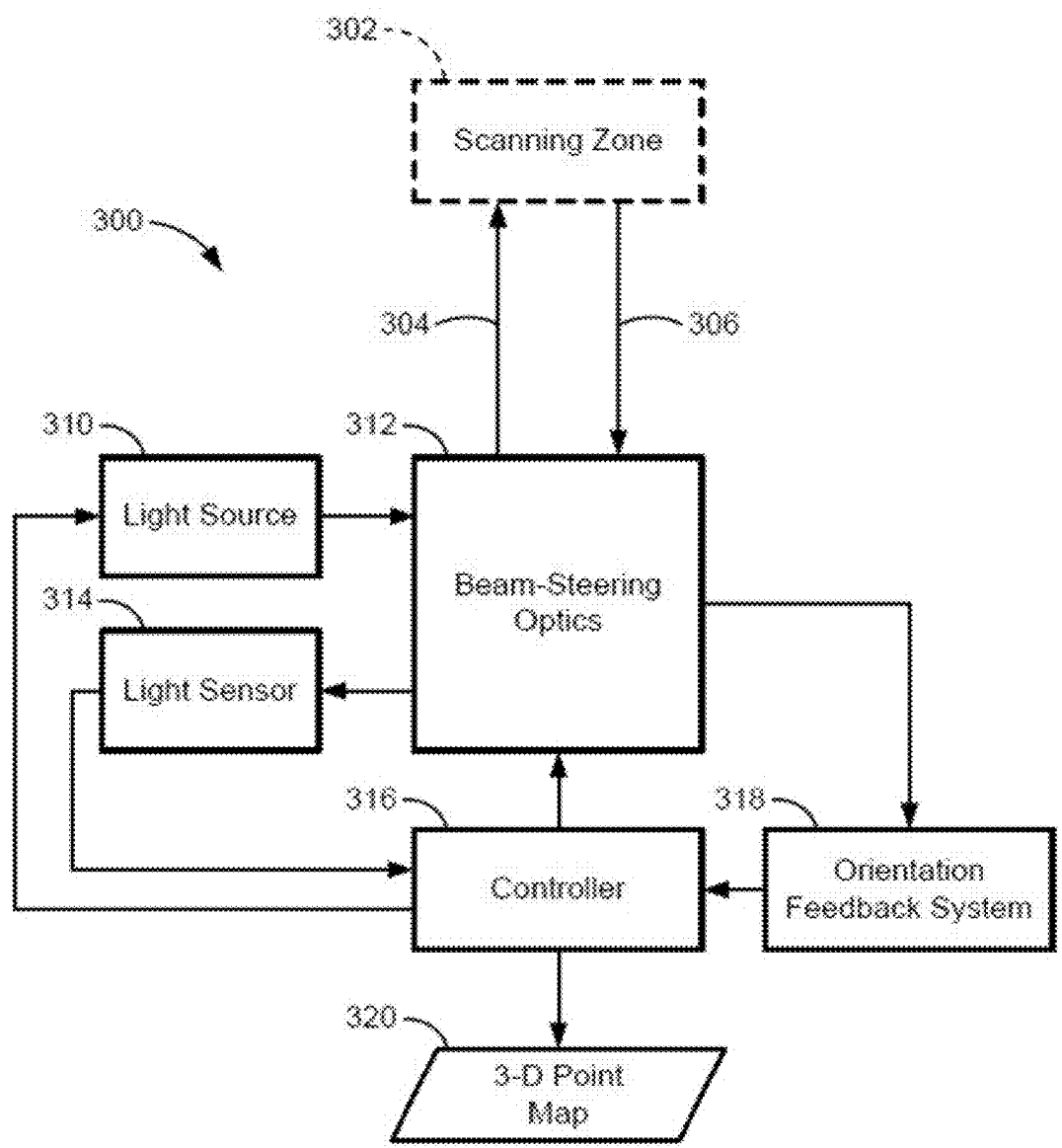
FIG. 3 is a block diagram of an example light detection and ranging (LIDAR) system.

FIG. 3 is a block diagram of an example LIDAR device 300. The LIDAR device 300 includes a light source 310, beam-steering optics 312, a light sensor 314, and a controller 316. The light source 310 may emit pulses of light toward the beam-steering optics 312, which directs the pulses of light 304 across a scanning zone 302. Reflective features in the scanning zone 302 reflect the pulses of light 304 and the reflected light signals 306 can be detected by the light sensor 314. The controller 316 regulates the operation of the light source 310 and beam-steering optics 312 to scan pulses of light 304 across the scanning zone 302. The controller 316 can also be configured to estimate positions of reflective features in the scanning zone 302 based on the reflected signals 306 detected by the light sensor 314. For example, the controller 316 can measure the time delay between emission of a pulse of light and reception of a reflected light signal and determine the distance to the reflective feature based on the time of flight of a round trip to the reflective feature. In addition, the controller 316 may use the orientation of the beam-steering optics 312 at the time the pulse of light is emitted to estimate a direction toward the reflective feature. For example, an orientation feedback system 318 can send information to the controller 316 indicating the orientation of the beam-steering optics 312 (and thus the direction of the emitted pulse of light). The estimated direction (e.g., from the orientation feedback system 318) and estimated distance (e.g., based on a measured time delay) can be combined to estimate a three-dimensional position from which the returning light signal 306 was reflected. The controller 316 may combine a series of three-dimensional position estimations (e.g., from each received reflected light signal 306) from across the scanning zone 302 to generate a three-dimensional point map 320 of reflective features in the scanning zone 302.

The light source 310 can be a laser light source that emits light in the visible, infrared, and/or ultraviolet spectrum. Moreover, the light source 310 can optionally include a plurality of light sources each emitting pulses of light. In an example with multiple light sources, each light source may be directed to the scanning zone 302 by the beam-steering optics 312. For example, a group of light sources can each be aimed at a single rotating mirror. The group of light sources can be aimed such that each light source reflects from the mirror at a distinct angle and therefore scans a substantially distinct region of the scanning zone 302. Additionally or alternatively, the light sources may scan wholly or partially overlapping regions of the scanning zone 302. Additionally or alternatively, more than one beam-steering optical device can be provided, and each such beam-steering optical device can direct light pulses from one or more light sources.

As illustrated in FIG. 3, the reflected light signals may be directed to the light sensor 314 by the beam-steering optics 312. However, this is just one configuration provided for example purposes. Some embodiments of the LIDAR device 300 may be arranged with a light sensor configured to receive reflected light from the scanning zone 302 without first being directed via the beam-steering optics 312.

The controller 316 is configured to control the operation of the light source 310 and the beam-steering optics 312 to cause pulses of light 304 to be emitted across the scanning zone 302. The controller 316 also receives information from the light sensor 314 to indicate the reception of reflected light signals 306 at the light sensor 314. The controller 316 can then determine the distance to surrounding objects by determining the time delay between emission of a light pulse and reception of a corresponding reflected light signal. The time delay indicates the round trip travel time of the emitted light from the LIDAR device 300 and a reflective feature in the scanning zone 302. Thus, a distance to a reflective feature may be estimated by dividing the time delay by the speed of light, for example.

The three-dimensional position of the reflective feature can then be estimated by combining the estimated distance with the orientation of the beam-steering optics 312 during the emission of the pulse. In some examples, the orientation of the beam-steering optics 312 can be detected by an orientation feedback system 318 configured to sense the orientation of the beam-steering optics 312. The orientation feedback system 318 can then provide an indication of the orientation of the beam-steering optics 312 to the controller 316 and use the orientation information to estimate three-dimensional positions associated with received reflected light signals.

In some examples, by scanning the emitted pulses 304 across the scanning zone 302, the LIDAR device 300 can be used to locate reflective features in the scanning zone 302. Each reflected light signal received at the light sensor 314 may be associated with a three-dimensional point in space based on the measured time delay and orientation of the beam-steering optics 312 associated with each reflected light signal. The combined group of three-dimensional points following a scan of the scanning zone 302 can be combined together to create a 3-D point map 320, which may be output from the LIDAR device 300. The 3-D point map 320 may then be analyzed by one or more functional modules used to control an autonomous vehicle. For example, the 3-D point map 320 may be used by the obstacle avoidance system 144 and/or navigation/pathing system 142 in the vehicle 100 to identify obstacles surrounding the vehicle 100 and/or to control the vehicle 100 to avoid interference with such obstacles.

The beam-steering optics 312 may include one or more mirrors, lenses, filters, prisms, etc., configured to direct light pulses from the light source 310 to the scanning zone 302. The beam-steering optics 312 may be configured to direct the light pulses according to an orientation indicated by signals from the controller 316. For example, the beam-steering optics 312 may include one or more mirrors configured to rotate and/or oscillate according to signals from the controller 316. The controller 316 can thereby control the direction of emission of light pulse(s) 304 from the LIDAR device 300 by providing suitable control signals to the beam-steering optics 312.

The beam-steering optics 312 can be operated to scan the light from the light source 310 across the scanning zone 302 at a regular interval (e.g., to complete a full scan of the scanning zone 302 periodically). In this way, the LIDAR device 300 may be used to dynamically generate three-dimensional point maps of reflecting features in the scanning zone 302. The three-dimensional map may be updated at a frequency that is sufficient to provide information useful for real time navigation and/or obstacle avoidance for an autonomous vehicle (e.g., the autonomous vehicles 100, 200 discussed above in connection with FIGS. 1-2). For example, the 3-D point map 320 may be refreshed at a frequency of about 10 hertz to about 100 hertz and such refreshed point map information may be used to identify obstacles of an autonomous vehicle on which the LIDAR device 300 is mounted and then control the vehicle to avoid interference with such obstacles.

Figure 4A:
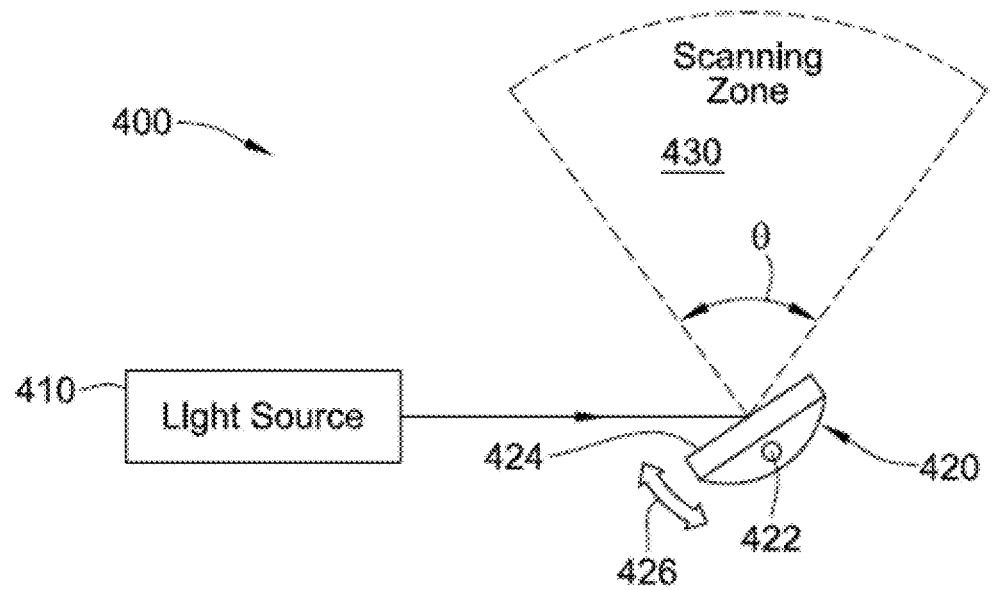
FIG. 4A is a diagram of an example LIDAR system that scans a scanning zone via an oscillating mirror.

FIG. 4A is a diagram of an example LIDAR system 400 that scans a scanning zone 430 via an oscillating mirror 420. The example LIDAR system 400 includes a light source 410 arranged to emit pulses of light at a reflective surface 424 of the oscillating mirror 420. The LIDAR system 400 may also include a light sensor (not shown), orientation feedback system (not shown), and controller (not shown), similar to those described above in connection with FIG. 3. Thus, the LIDAR system 400 illustrated in FIG. 4 may be configured to detect returning reflected light signals and use the reflected light signals to generate three-dimensional point map of reflective features in the scanning zone 430.

The oscillating mirror 420 can rotate about its axis 422. The axis 422 may be defined by, for example, a pivot rod oriented parallel to the reflective surface 424 of the mirror 420. The oscillating mirror 420 can be driven to oscillate back and forth (as indicated by the motion arrow 426) such that the light from the light source 410 sweeps across an angle θ. The scanning zone 430 may therefore be a region defined by a cone having an apex approximately located at the oscillating mirror 420 and with opening angle θ. For example, the mirror 420 may be driven to oscillate with a frequency of about 60 hertz, which may also be the refresh rate of the LIDAR system 400.

Figure 4B:
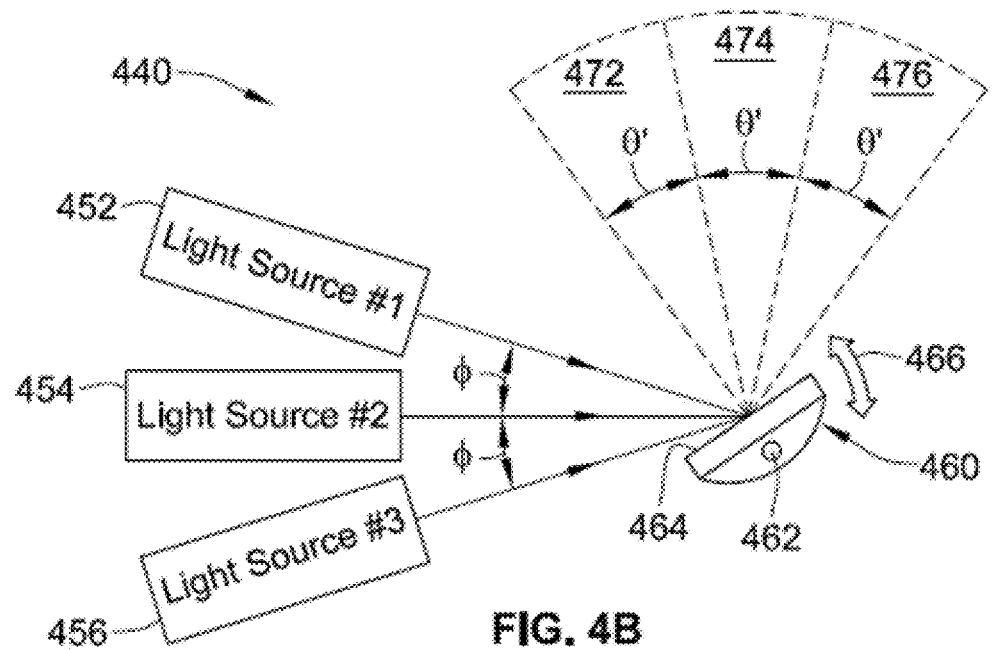
FIG. 4B is a diagram of an example LIDAR system that employs multiple light sources reflected from an oscillating mirror to scan a scanning zone.

FIG. 4B is a diagram of an example LIDAR system 440 with multiple light sources 452-456 each scanning a portion of a scanning zone. For example purposes FIG. 4B shows the system 440 with three light sources (i.e., the first light source 452, second light source 454, and third light source 456). The light sources 452-456 can be arranged such that light emitted from each is directed toward a reflective side 464 of an oscillating mirror 460. The light sources 452-456 can each emit light from a distinct position such that pulses of light emitted from each of the respective light sources 452-456 define an angle with respect to one another. For example, the first light source 452 and second light source 454 can emit light from distinct positions that are separated by an angle φ when the light emitted from each is aimed at the oscillating mirror 460. Similarly, the second light source 454 and third light source 456 can be arranged such that light emitted from the two light sources 454, 456 defines an angle φ when the light emitted from each is aimed at the oscillating mirror 460. Thus, by steering light emitted from each light source (e.g., the light sources 452-456), the oscillating mirror 460 can scan each light source across a respective scanning zone (e.g., the scanning zones 472-476). The angular span of each scanning zone 472-476 (e.g., the angle θ' shown in FIG. 4B) can be due to the oscillation of the mirror 460 (e.g., as shown by the directional arrow 466). Accordingly, the angular span of each scanning zone may be the same (e.g., θ'). Alternatively, the respective angular spans of the scanning zones may be different in some examples.

The angular separation between the light sources 452-456 may cause the emitted light pulses from each light source to scan across a distinct scanning zone. Thus, each of the light sources 452-456 can be associated with a distinct scanning zone. For example, the first light source 452 can be scanned across the first scanning zone 472; the second light source 454 can be scanned across the second scanning zone 474; and the third light source 456 can be scanned across the third scanning zone 476. Additionally or alternatively, the scanning zones (e.g., the scanning zones 472-476) may include at least partially overlapping regions of surrounding environment. The scanning zones 472-476 are identified separately for convenience in explaining the arrangement with multiple angularly offset light sources. However, it is noted that information from the multiple scanning zones can be combined (e.g., via a controller) to create a combined three-dimensional point map for use by navigation and/or obstacle avoidance systems of an autonomous vehicle (e.g., the autonomous vehicles 100, 200 described in connection with FIGS. 1 and 2 above).

The LIDAR system 440 is shown with three light sources (e.g., the light sources 452-456) each directed at a single oscillating mirror 460 to scan three scanning zones (e.g., the scanning zones 472-476). However, some embodiments of the present disclosure may include more than three light sources and more than three scanning zones. For example, ten light sources may be arranged to be with approximately 2° of relative angular separation (or another relative angular separation), such that each light source scans a scanning zone that is offset from its neighbor by approximately 2°. The oscillating mirror 460 may oscillate to cause the light from each light source to scan a region with an opening angle of approximately 2°. For example, the oscillating mirror 460 may oscillate back and forth by 2° (e.g., plus and minus 1° from a nominal position) such that the pulses of light from the light sources are scanned across their respective scanning zones.

Figure 5A:
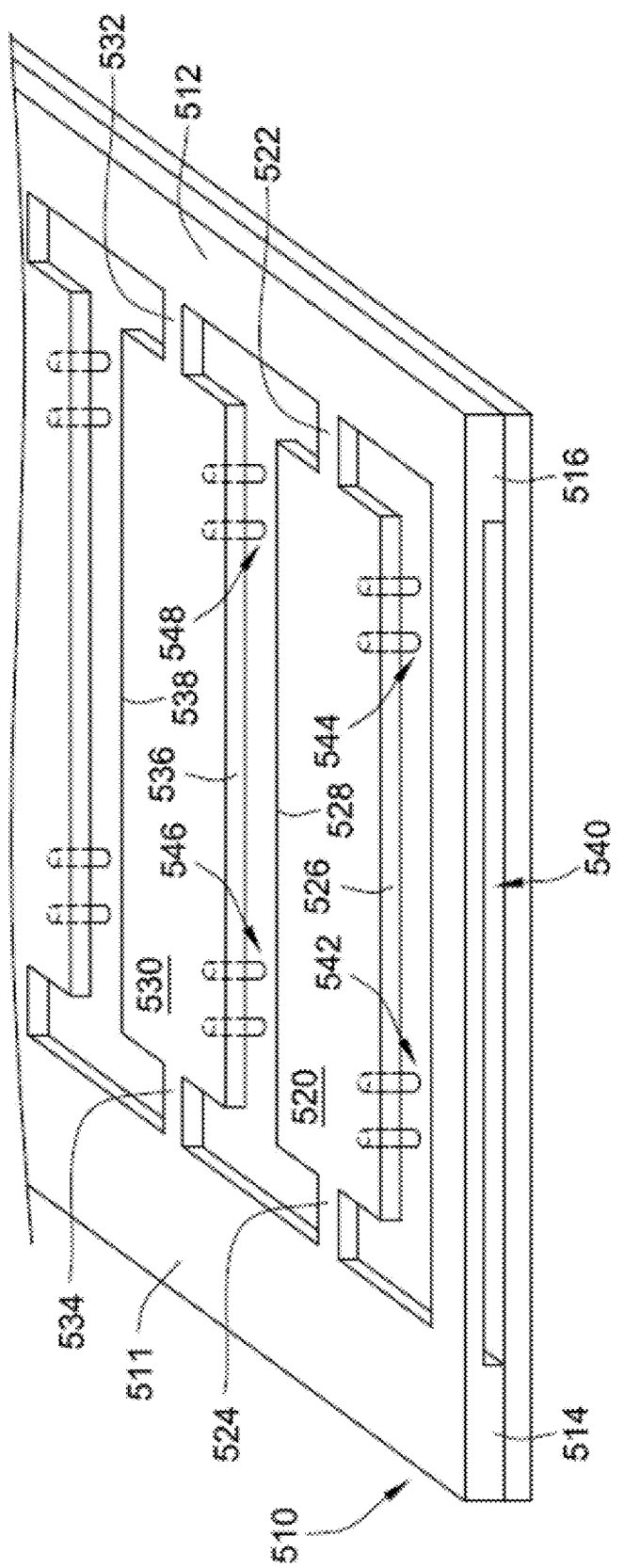
FIG. 5A is an aspect view of an example beam-steering device having multiple oscillating reflective slats.

FIG. 5A is an aspect view of an example beam-steering device having an arrangement of multiple mirrors. As described further below, the multiple mirrors can be driven to oscillate such that a pulse of light incident on the beam-steering device (e.g., from light source in a LIDAR system) can be directed toward a scanning zone according to the orientation of the mirrors. The arrangement of multiple mirrors can include reflective slats arranged with respective axes of rotation of the reflective slats oriented in parallel. Each of the reflective slats can be separately controlled by an electromagnetic driving system that causes the reflective slats to oscillate in phase while accounting for variations in resonant frequencies of each reflective slat. By operating the reflective slats to oscillate in phase, the reflective slats are substantially aligned in parallel planes at any given instant, and so light incident on the slats can be reflected in a common direction. An incident light pulse (or series of pulses) can then be simultaneously reflected by multiple ones of the reflective slats in the arrangement with the reflected light from each slat directed in a common direction. The arrangement of reflective slats described herein in connection with FIGS. 5-6 is thus one example of a beam-steering device with multiple mirrors driven in phase to cooperatively scan pulses of light across a scanning zone for a LIDAR device.

The example beam-steering device shown in FIG. 5A illustrates a first reflective slat 520 and a second reflective slat 530 for convenience in explanation, although some embodiments may include additional reflective slats (such as the third reflective slat partially visible in FIG. 5A). Moreover, the diagrams of the beam-steering device and reflective slats are not necessarily illustrated to scale in FIGS. 5-6. Instead, the various features of the example beam-steering device are illustrated for explanatory purposes in a manner intended to facilitate understanding and may exaggerate certain features and/or dimensions.

The example beam-steering device shown in FIG. 5A includes a frame 510 with a first side rail 511 and a second side rail 512. The first reflective slat 520 is connected to the frame 510 by a connecting arm 524 connected to the first side rail 511 and a connecting arm 522 connected to the second side rail 512. The connecting arms 522, 524 can connect to the reflective slat 520 along a line that defines the axis of rotation of the reflective slat 520. During rotation of the reflective slat 520 with respect to the frame 510, the connecting arms 522, 524 may twist (e.g., torsionally deform) such that the normal direction of the reflective slat 520 rotates about an axis of rotation that passes through the two connecting arms 522, 524. In some examples, the connecting arms 522, 524 may resist twisting, and thereby bias the reflective slat 520 in a nominal position where the connecting arms 522, 524 are in a relaxed untwisted state. The connecting arms 522, 524 may therefore generate a restorative force that urges the reflective slat 520 toward its nominal position in a manner analogous to a mass on a spring that is urged toward a position where the spring is in a relaxed state. Perturbing the reflective slat 520 can therefore cause the reflective slat 520 to oscillate about its nominal position. Further, applying periodic perturbations to the reflective slat 520 can cause the reflective slat 520 to undergo oscillatory motion with a frequency based on the frequency of the applied perturbations.

The connecting arms 522, 524 can be arranged such that the axis of rotation of the reflective slat 520 approximately bisects the reflective slat 520. For example, the connecting arms 522, 524 may connect to the reflective slat 520 at mid-points of opposing ends of the reflective slat 520 such that the axis of rotation defined by the connecting arms 522, 524 approximately bisects the reflective slat 520. In some examples, the reflective slat 520 can have an elongated shape with a long dimension aligned in parallel to the axis of rotation. Thus, the connecting arms 522, 524 may connect to the reflective slat 520 along sides extending in the width dimension of the reflective slat 520 (e.g., to short sides of the rectangle-shaped reflective slat 520). At the same time, the side edges 526, 528 along the length dimension of the reflective slat 520 may be free of connection to the connecting arms 522, 524. In an example where a pattern of reflective slats are arranged in a single row with each slat having an approximately rectangle shape, the long sides of the slats can be situated next to one another and the axes of rotation of the slats can be oriented in parallel and along the lengths of the slats.

The connecting arms 522, 524 may connect to the reflective slat 520 at mid-points of opposite ends of the reflective slat 520. The connecting arms 522, 524 may be, for example, narrow strips integrally formed with the reflective slat 520. For example, the connecting arms 522, 524 may be integrally formed with the reflective slat 520. Additionally or alternatively, the connecting arms 522, 524 may be integrally formed with the side rails 511, 512 (or some portion of the side rails). Additionally or alternatively, the connecting arms may mechanically connect to one or both of the reflective slat 520 and the side rails 511, 512 using adhesives, fasteners, welding, soldering, etc.

In some embodiments, the connecting arms 522, 524 may be narrow strips that are integrally formed with the reflective slat 520. For example, the reflective slat 520 and the connecting arms 522, 524 can be formed by cutting out the shape of the reflective slat 520 and connecting arms 522, 524 from a sheet of suitably reflective flexible material, such as a sheet of silicone steel. Moreover, a pattern of one or more such mirrors arranged in a pattern of reflective slats suspended by integrally formed connecting arms may be cut out from a sheet of silicone steel using a high pressure water-jet cutting system, for example.

Similar to the first reflective slat 520, the second reflective slat 530 is mounted to the frame 510 by connecting arms 532, 534. The connecting arms 532, 534 can twist to allow the second reflective slat 530 to rotate with respect to the frame 510. Thus, the second reflective slat 530 can rotate about an axis of rotation defined by the two connecting arms 532, 534 (e.g., an axis of rotation that passes through the connecting arms 532, 534). The two connecting arms 532, 534 may be, for example, narrow strips of material that are integrally formed with the second reflective slat 530.

The reflective slat 530 may have an elongated shape (e.g., a rectangle), and connecting arms 532, 534 can be connected to opposite ends of the reflective slat 530 along the short sides of the reflective slat 530. The sides 536, 538 along the long dimension of the reflective slat 530 can be situated adjacent neighboring reflective slats in the pattern. For example, the long side 536 of the reflective slat 530 can be adjacent the long side 528 of the reflective slat 520, and the two can edges can be separated by a distance sufficient to allow each reflective slat to oscillate about its respective axis of rotation without interfering with the other reflective slat.

The axes of rotation of the two reflective slats 520, 530 can be oriented in parallel. Moreover, the axes of rotation of the two reflective slats 520, 530 (and any additional reflective slats in the beam-steering device) can be oriented in parallel and in a common plane, such as the plane of the frame 510. During oscillation of the pattern of reflective slats, the respective long edges (e.g., the edges 526, 528, 536, 538) of the reflective slats can oscillate up and down, through the common plane of the axes of rotation, while the axes of rotation remain in the common plane.

A substrate 540 including an electromagnetic driving system can be mounted to an underside of the frame 510 via first and second legs 514, 516 of the frame 510. That is, the legs 514, 516 can act as spacers to create a separation between the substrate 540 and the bottom side of the pattern of oscillating mirrors (e.g., the pattern of reflective slats). The electromagnetic driving system can include pairs of electromagnets arranged to attract particular ones of the reflective slats. For example, a first pair of electromagnets 542 and a second pair of electromagnets 544 are situated on the substrate 540 underneath the first reflective slat 520. The electromagnets 542, 544 can include, for example ferromagnetic pegs extending outward from the substrate 540 toward the underside of the reflective slat 520. The pegs can extend into the substrate 540 where conductive traces coil around the pegs such that the pegs are cores in the electromagnets. Energizing the coils in the substrate 540 with current activates the electromagnets 542, 544 and thereby attracts the reflective slat 520 toward the electromagnets 542, 544. For example, where the reflective slat 520 includes silicone steel, energizing the electromagnets 542, 544 induces a complementary magnetic response in the reflective slat 520 via surface currents in the silicone steel. However, it is noted that silicone steel is only one example and other materials may be used for the reflective slats, such as other metals, etc. that exhibit: sufficient induced magnetization to allow for controlling with an electromagnetic driving system, sufficient flexibility to allow for oscillating the reflective slats, and/or sufficient reflectivity to allow for reflecting incident light. Moreover, combinations of materials that exhibit such properties may also be used to form the reflective slats, such as a multi-layer composite that includes a ferromagnetic bottom later, a reflective top coating, and/or fiber-based flexible ends to allow torsional oscillation.

In some embodiments, each pair of electromagnets (e.g., the pair of electromagnets 542), can be arranged to have opposite polarity. For example the conductive traces that coil around the pegs can be wound in opposite directions such that each pair of electromagnets includes, when energized: one electromagnet with its north pole faced toward the underside of the reflective slat 520, and one electromagnet with its south pole faced toward the underside of the reflective slat 520. This arrangement can allow for the respective pairs of electromagnets and the induced magnetic response of the reflective slat 520 to complete a magnetic circuit in an area roughly proportionate to the spacing of each pair of electromagnets (e.g., the pair of electromagnets 542). Providing pairs of opposite-polarity electromagnets can thus substantially confine induced magnetic responses in the reflective slat 520 to the region near each pair of electromagnets and thereby avoid substantial induced magnetic effects across the remainder of the reflective slat.

Situating the pairs of electromagnets 542, 544 on the substrate 540 at a position radially offset from the axis of rotation of the reflective slat 520 (e.g., with ends of the pegs proximate the long edge 526 of the reflective slat 520) allows for torque to be applied on the reflective slat 520. For example, energizing the electromagnets 542, 544 can attract the long edge 526 of the reflective slat 520 toward the electromagnets 542, 544 and thereby urge the reflective slat 520 to rotate about its axis defined by the connecting arms 522, 524. Activating the electromagnets 542, 544 can thereby urge the long edge 526 toward the substrate 540 while the opposing long edge 528 moves away from the substrate 540.

Following the attraction of the long edge 526 of the reflective slat 520 toward the substrate 540, the electromagnets 542, 544 can be deactivated. For example, current flowing through the traces coiled around the pegs of the electromagnets 542, 544 can be turned off. Once the electromagnets 542, 544, the reflective slat 520 can rotate back toward its nominal position. For example, the connecting arms 522, 524, which twist to allow the reflective slat 520 to rotate, can urge the reflective slat 520 to move back toward its nominal position (e.g., where the connecting arms 522, 524 are in an untwisted, relaxed state). In some examples, the twisted connecting arms 522, 524 can cause the reflective slat 520 to oscillate about its axis of rotation following deactivation of the electromagnets 542, 544. For example, once the electromagnetic attractive force ceases, the reflective slat 520 may swing in the opposite direction of rotation until the long edge 528 is relatively closer to the substrate 540 than the edge 526 that was initially attracted by the electromagnets 542, 544. The twisting of the connecting arms 522, 524 can thereby serve as a restorative force on the orientation of the reflective slat that continuously urges the reflective slat 520 toward its nominal position and with the magnitude of the restorative related to the amount of twisting in the connecting arms 522, 524 (and thus the angular change away from the nominal position). In some embodiments, the connecting arms 522, 524 cause the reflective slat 520 to rotate back and forth about its axis of rotation in an oscillatory manner following a perturbation away from its nominal position due to the electromagnets 542, 544.

Similarly, the second reflective slat 530 can be caused to oscillate about its axis of rotation by the electromagnets 546, 548. The electromagnets 546, 548 can be activated to induce a magnetic attractive force between the electromagnets 546, 548 and the reflective slat 530. Because the electromagnets 546, 548 are offset from the axis of rotation of the reflective slat 530, the attractive force exerts a torque on the reflective slat 530 and thereby causes the second reflective slat 530 to rotate about the axis defined by the connecting arms 532, 534. The attractive force can result in, for example, the long edge 536 of the second reflective slat 530 being urged toward the electromagnets 546, 548 (and thus the substrate 540) while the opposite long edge 538 moves away from the substrate 530. Deactivating the electromagnets 546, 548 (e.g., by halting current through traces wrapped around the pegs in the electromagnets 546, 548) ceases the induced magnetism and the second reflective slat 530 can then rotate back toward its nominal position to allow the connecting arms 532, 534 to untwist.

For example, the reflective slats 520, 530 can be driven with an electromagnetic driving system to oscillate in phase such that the orientation of the reflective slats (e.g., defined by the normal directions of the reflective slats) can be in parallel. An incident light pulse can have a beam size that spans more than one of the reflective slats, and thus each reflective slat can separately reflect a portion of the incident light in a common direction. The arrangement of separately controlled reflective slats can be used to direct ("steer") incident light (e.g., according to substantially plane-parallel orientation of each reflective slat). By operating the pattern of reflective slats (e.g., the reflective slats 520, 530, etc.) to oscillate in phase, reflected light can be scanned across a scanning zone according to the frequency of the oscillation.

FIG. 5B is a top view of the example beam-steering device shown in FIG. 5A. FIG. 5C is an end view of the example beam-steering device shown in FIG. 5A. FIGS. 5B and 5C identify several dimensions for convenience in referring to the drawings, although it is noted that the diagrams in FIGS. 5B and 5C are not necessarily drawn to scale and therefore the relative lengths of the dimensions indicated in the drawings may not reflect relative relationships between the various dimensions.

With reference to both FIGS. 5B and 5C, the reflective slats 520, 530 have an outward-facing reflective surface 521, 531 and an opposite back surface 523, 533 (e.g., the surface facing the substrate 540). The reflective surfaces 521, 531 can be coated with a reflective material, such as a layer of metal formed on the reflective slat 520. The reflective surface 521, 523 may include, for example, aluminum, tin, gold, silver, combinations of these, etc. and may additionally or alternatively include a substantially transparent layer (e.g., glass, polymeric material, etc.) coated on the reflective material to preserve the reflective surface 521, 523. For example, a transparent protective may prevent the reflective layer from degrading by oxidation, surface deformation, etc.

The reflective slats 520, 530 each have a generally rectangular shape with length $L_{sl}$ and width $W_{sl}$. In some embodiments, the reflective slats 520, 530 can each have a length of about 3 centimeters and a width of about 0.5 centimeters, for example. The lengths of the reflective slats 520, 530 (along the long sides 526, 528, 536, 538) can extend parallel to the respective axes of rotation defined by the pairs of connecting arms 522, 524 and 532, 534 for each reflective slat. At the same time, the widths of the reflective slats 520, 530 (along the short sides 525, 527, 535, 537) can extend perpendicular to the respective axes of rotation defined by the pairs of connecting arms 522, 524 and 532, 534 for each reflective slat. Thus, the length dimension $L_{sl}$ of the reflective slats extends between the opposite short ends 525 and 527 (or 535 and 537), while the width dimension $W_{sl}$ of the reflective slats extends between the opposite long ends 526 and 528 (or 536 and 538).

The reflective slat 520 can be situated adjacent the second reflective slat 530. The two reflective slats 520, 530 can be separated by a separation distance $d_{sep}$ (labeled in FIG. 5B) between the long side edges 528 and 536 of the two reflective slats 520, 530. The separation distance $d_{sep}$ can generally be selected to allow enough space for the two reflective slats 520, 530 to oscillate without interfering with one another. For example, the separation distance $d_{sep}$ may be minimized while accounting for the thickness of the slats 520, 530 and for engineering and/or manufacturing tolerances. Generally, minimizing the separation distance $d_{sep}$ between adjacent ones of the reflective slats (e.g., the slats 520, 530) allows the total combined reflective surface area of the array of oscillating mirrors to be maximized. Moreover, the two reflective slats 520, 530 can be arranged with substantially parallel axes of rotation (e.g., as defined by a line between the pairs of connecting arms 522, 524 or 532, 534) that are also oriented in a common plane (e.g., the plane of the frame 510 to which the connecting arms 522, 524, 532, 534 are mounted).

The connecting arms 522, 524, 532, 534 each have a length $L_{ax}$ and width $W_{ax}$. Both the length $L_{ax}$ and width $W_{ax}$ of the connecting arms 522, 524 influence the resistance to twisting of the connecting arms 522, 524, and thus influence the susceptibility of the reflective slat 520 to oscillate in response to being acted on by the electromagnets 542, 544. The connecting arms 522, 524, 532, 534 also have a thickness (as evident in FIG. 5C), which can influence the oscillatory response of the reflective slat 520. The thickness of the connecting arms 522, 524, 532, 534 may be substantially the same as the thickness of the reflective slats 520, 530 (e.g., the distance between the reflective surface 521 and the back surface 523). Moreover, the material used to form the connecting arms 522, 524 can influence the susceptibility to twisting the connecting arms 522, 524. For example, relatively more flexible materials may exhibit less resistance to twisting than relatively less flexible materials. Similar to the reflective slat 520, the oscillatory responsiveness of the reflective slat 530 can be influenced by the dimensions and/or materials of the connecting arms 532, 534.

In some embodiments, the orientation of the axes of rotation can be selected to provide a desired moment of inertia of the reflective slat 520, 530. A desired moment of inertia may be selected, for example, based in part on a desired frequency of oscillation because relatively higher oscillation frequencies are more readily achievable by rotating features with relatively lower moments of inertia. For example, aligning the axes of rotation along the lengths of the reflective slats 520, 530 can provide a relatively lower moment of inertia, and therefore a higher achievable frequency of oscillation than in an arrangement with axes of rotation aligned along the widths of the reflective slats 520, 530.

The connecting arms 522, 524, 532, 534 can be arranged to provide an axis of rotation for each reflective slat 520, 530 that passes through the centers of mass of each of the reflective slats. For example, with reference to the reflective slat 520, the connecting arm 522 can connect at the midpoint of the short edge 525 and the connecting arm 524 can connect at the midpoint of the short edge 527 such that the resulting axis of rotation of the reflective slat 520 at least approximately bisects the reflective slat 520 (e.g., along a line connecting the midpoints of the two short ends 525, 527). Similarly, the connecting arms 532, 534 can connect to the midpoints of the short edges 535, 537 of the reflective slat 530 such that the resulting axis of rotation of the reflective slat 530 at least approximately bisects the reflective slat 530.

In some embodiments, a desired oscillatory response of the reflective slats 520, 530 (and any other reflective slats in the pattern of mirrors of the beam-steering device) can be selected ("tuned") by selecting the dimensions of the reflective slats and/or connecting arms (e.g., the dimensions $L_{sl}$, $W_{sl}$, $L_{ax}$, $W_{ax}$, etc.) the materials used to form the reflective slats and/or connecting arms, and/or the arrangement of the axes of rotation of the reflective slats.

FIGS. 5B and 5C also illustrate the electromagnets 542-548 of the electromagnetic driving system used to cause the reflective slats 520, 530 to oscillate. In particular, the end view of FIG. 5C shows that the peg 544a from one of the pair of electromagnets 544 emerges from the substrate 540 at a position that is radially offset from the axis of rotation off the reflective slat 520. As shown in FIG. 5C, the peg 544a is located on the substrate 540 at a radial distance $d_{rad}$ from the position of the axis of rotation of the reflective slat (e.g., as defined by the center point of the connecting arm 522). Situating the electromagnets 542, 544 to be radially offset from the axis of rotation by the distance $d_{rad}$ (e.g., proximate the long side edge 526) allows the electromagnetic attraction between the electromagnets 542, 544 and the reflective slat 520 to apply a torque on the reflective slat 520 and thereby cause the reflective slat 520 to oscillate about its axis of rotation. At the same time, the distance $d_{rad}$ is may be less than the half-width of the reflective slat 520, such that the electromagnets 542, 544 are located entirely underneath the reflective slat 520 (and not also underneath neighboring reflective slats). Situating the electromagnets 542, 544 underneath only the reflective slat 520 also allows the induced magnetism of the reflective slat 520 to shield neighboring magnetic slats (e.g., the reflective slat 530) from the effects of the electromagnets 542, 544.

As shown in FIG. 5C, the end of the peg 544a furthest from the substrate 540 is separated from the bottom side 523 of the reflective slat 520 by a distance $d_{gap}$. The dimension $d_{gap}$ can influence the amount of magnetic coupling between the reflective slat 520 and the electromagnets 542, 544. The pairs of electromagnets 542, 544 for driving the reflective slat 520 are described further with reference to FIG. 5D below.

FIG. 5D is a cross-sectional side view of one of the reflective slats 520 that shows example electromagnets 542, 544 associated with the reflective slat 520. The first pair of electromagnets 542 includes a first peg 542a and a second peg 542b that can be cores of the pair of electromagnets 542. The two pegs 542a-b can each be magnetized by conductive traces embedded in the substrate 540 that coil around the pegs 542a-b (e.g., the traces 566-568 coiled around the peg 542a). The traces (e.g., the traces 566-568) can coil around pairs of pegs in opposite directions to create electromagnets with opposite polarity in each pair of electromagnets. Thus, the traces 566-568 can coil around the first peg 542a in one direction and the traces around the second peg 542b can coil in the opposite direction. As a result, the slat-facing end 562 of the first peg 542a can have a north magnetic polarity while the opposite end 564 of the first peg 542a has a south magnetic polarity. At the same time, the slat-facing end of the second peg 542b can have a south magnetic polarity while the opposite end of the second peg 542b has a north magnetic polarity. Additionally or alternatively, the first peg 542a can be energized with its south magnetic polarity toward the reflective slat 520 and the second peg 542b can be simultaneously energized with its north magnetic polarity toward the reflective slat 520. Similarly, the traces around the pegs 544a-b of the second pair of electromagnets 544 can be wound in opposite directions such that one has north magnetic polarity toward the reflective slat 520 and the other has south magnetic polarity toward the reflective slat 520.

By energizing the pair of electromagnets 542 (or 544) to have opposite polarities as discussed herein the induced magnetization of the reflective slat 520 can complete a magnetic circuit substantially confined to the region nearest the pair of electromagnets 542 (or 544). For example, in an example where the pegs 542a-b (or 544a-b) are separated by a distance $d_{pair}$ (i.e., the distance between the centers of the pegs 542a-b), the induced magnetization of the reflective slat 520 can extend roughly over a region characterized by the distance $d_{pair}$. In some embodiments, the distance $d_{pair}$ can be approximately 2-3 millimeters. The peg 542a is also located a distance $d_{end}$ from the short-side end 527 of the reflective slat 520. The distance $d_{end}$ can be approximately 2-3 millimeters, for example. By situating the pegs 542a-b and 544a-b relatively near the short-side ends 525, 527, the magnetic attraction from the electromagnets does not significantly deform the reflective surface 521 of the slat 520. By contrast, a single electromagnet located near the center of the side edge 526 of the reflective slat 520 (i.e., approximately equidistant from the two short-side ends 525, 527) may cause the reflective surface 521 of the slat 520 to deform ("flex") near its middle area while the regions near the side edges 525, 527 did not rotate as much.

The pegs 542a-b can each be mounted to a foundational sheet 550 to structurally support the pegs 542a-b. For example, the end 564 of the peg 542a (which is opposite the slat-facing end 562) can be coupled to the foundational sheet 550 (e.g., by welding, soldering, adhesives, etc.). The foundational sheet 550 may be a sheet including steel or another metal and/or ferromagnetic material. The substrate 540, which can be a printed circuit board, can be mounted on the foundational sheet 550. The foundational sheet 550 may complete a magnetic circuit between the pairs of electromagnets 542, 544. For example, energizing the pair of electromagnets 542 with opposite polarities can magnetize the region of the foundational sheet 550 between the two pegs 542a-b such that the two pegs 542a-b are part of a magnetic circuit with opposite polarities on the slat-facing ends of the two pegs 542a-b.

FIG. 6A is an end view of a reflective slat 610 oriented in a nominal position. The reflective slat 610 is mounted by a first connecting arm 612 and a second connecting arm (not visible) connected to opposite ends of the reflective slat 610. The connecting arm 612 can be configured to twist to allow the reflective slat 610 to rotate about an axis of rotation defined by the connecting arm 612. In some examples the reflective slat 610 and the connecting arm 612 can be formed from a reflective, flexible, and/or magnetic material such as silicone steel, for example. In some examples the connecting arm 612 can be a narrow strip that is integrally formed with the reflective slat 610.

An electromagnetic driving system includes an electromagnet 620 situated to magnetically attract the reflective slat 610 at a position radially offset from the axis of rotation defined by the connecting arm 612. In FIG. 6A, the reflective slat 610 is shown in a non-rotated position, which may be, for example, an orientation for which the connecting arm 612 is not stressed by twisting. The non-rotated position shown in FIG. 6A (which is also referred to herein as the nominal position) can therefore be considered a resting position, because the reflective slat 610 is not being urged to rotate and the connecting arm 612 is in a relaxed energy state. The non-rotated position is indicated in FIG. 6A by a line labeled 0° indicating the orientation of the reflective slat 610. The non-rotated position illustrated in FIG. 6A may occur while the electromagnet 620 is deactivated, and therefore not attracting the reflective slat 610, for example.

FIG. 6B is an end view of the reflective slat 610 oriented in a rotated position due to attraction between the reflective slat 610 and the electromagnet 620. For example, upon activation of the electromagnet 620 (e.g., by conveying current through a coil surrounding a ferromagnetic core), the side of the reflective slat 610 nearest the electromagnet 620 can be magnetically attracted toward the electromagnet 620. The reflective slat 610 may include a ferromagnetic material, such as steel, that becomes magnetized in response to the activation of the electromagnet 620 and thereby creates an attractive magnetic force between the electromagnet 620 and the region of the reflective slat 610 nearest the electromagnet 620. Attracting one side of the reflective slat 610 toward the electromagnet 620 can thus cause the reflective slat 610 to rotate (e.g., by twisting the connecting arm 612). The degree of rotation of the reflective surface of the reflective slat 610, relative to the nominal position, is shown in FIG. 6B as angle A.

During rotation, the connecting arm 612 twists to allow the reflective slat 610 to rotate. However, the connecting arm 612 can apply a torque on the reflective slat 610 to urge the reflective slat to return to the non-rotated position (i.e., the position shown in FIG. 6A). In some examples, the amount of torque applied by the connecting arm 612 is dependent on the amount the connecting arm 612 is twisted. For example, the connecting arm 612 may apply a torque on the reflective slat 610 that is proportionate to the amount of rotation away from the nominal position of the reflective slat 610. Moreover, the torque applied by the connecting arm 612, when twisted, can urge the reflective slat 610 to return to the nominal position (i.e., 0° orientation shown in FIG. 6A). Thus, during rotation the reflective slat 610 can be subjected to forces from both the electromagnet 620 and the connecting arm 612. In some examples, the reflective slat 610 may rotate toward the electromagnet 620 until a point where the torque on the reflective slat 610 applied by the electromagnet 620 balances the torque from the twisted connecting arm 612.

FIG. 6C is an end view of the reflective slat 610 oriented in a second rotated position due to the reflexive torque applied by the connecting arm 612. The degree of rotation of the reflective surface of the reflective slat 610, relative to the nominal position, is shown in FIG. 6C as angle B. The rotated position of the reflected slat 610 shown in FIG. 6C may occur following deactivation of the electromagnet 620. For example, the connecting arm 612 can become twisted during an initial attraction toward the electromagnet 620 (as shown in FIG. 6B). Once the electromagnetic attraction is turned off or decreased, the reflective slat 610 can rotate according to the force applied by the twisted connecting arm 612. The reflective slat 610 can be initially urged back toward the nominal position (as shown in FIG. 6A). Upon reaching the nominal position, the reflective slat 610 can then continue its rotational inertia to move through the nominal position, which causes the connecting arm 612 to twist in the opposite direction of that shown in FIG. 6B. Once twisted, the connecting arm 612 can apply a torque urging the reflective slat 610 toward the nominal position. The reflective slat 610 can continue rotating away from the electromagnet 620 until its direction of rotation is reversed by the twisted connecting arm 612.

Thus, the three views in FIGS. 6A-6C may represent portions of an electromagnetic driving sequence of the reflective slat 610. For example, FIG. 6A may illustrate the rest orientation of the reflective slat 610, where the connecting arm 612 is in an unstressed state and the electromagnet 620 is turned off. FIG. 6B may illustrate the reflective slat 610 at a maximum angle of deflection toward the electromagnet 620 (e.g., the angle A). FIG. 6C may illustrate the reflective slat 610 at a maximum angle of deflection away from the electromagnet 620 (e.g., the angle B).

In some embodiments, the driving system may include more than one electromagnet situated to attract the reflective slat and may include more than one reflective slat, such as an example with four electromagnets for each reflective slat.

Figure 7:
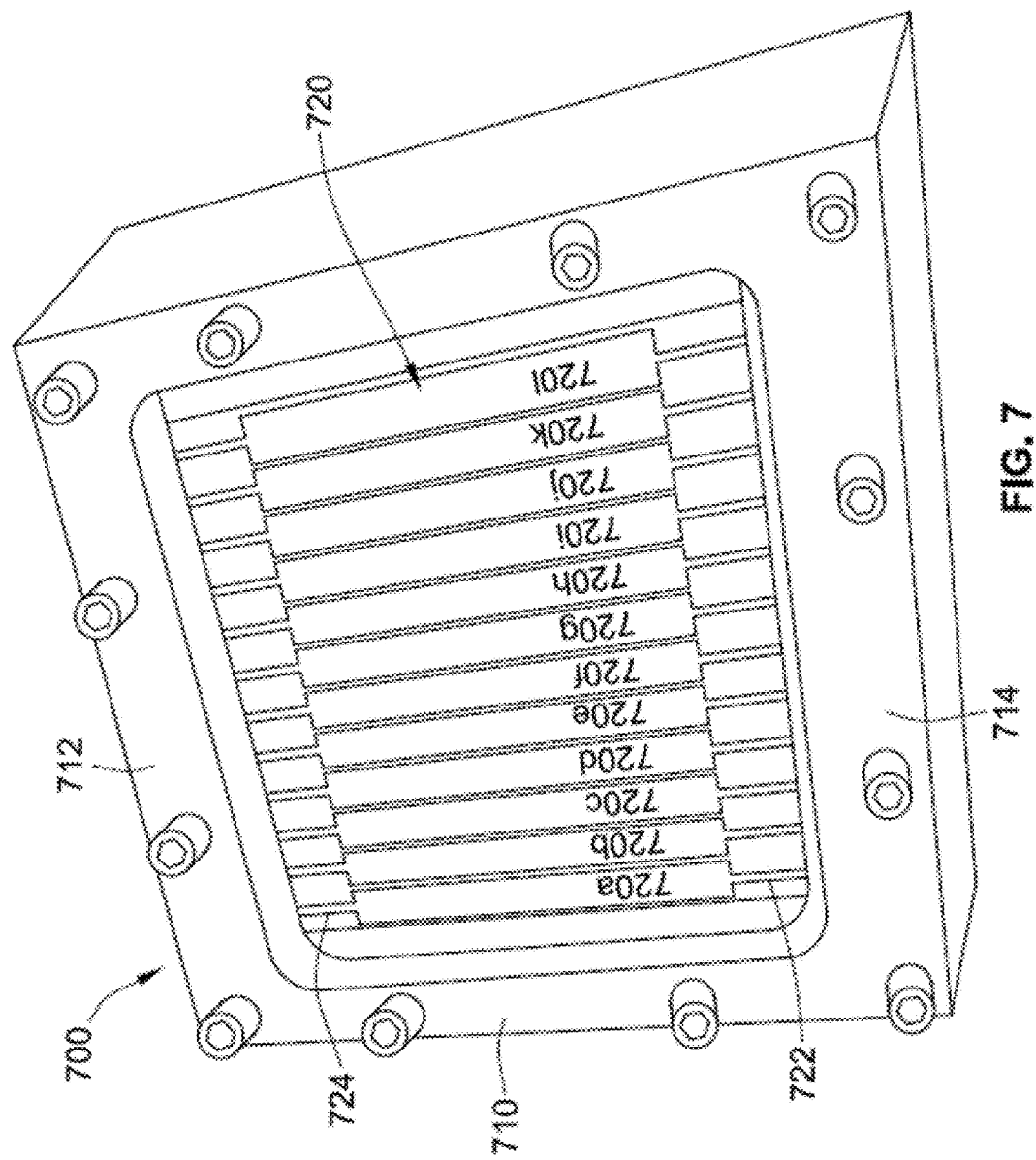
FIG. 7 is a view of a beam-steering device with multiple oscillating reflective slats, according to an example embodiment.

FIG. 7 is a view of an example beam-steering device 700 with multiple oscillating reflective slats 720. The beam-steering device 700 includes a frame 710 with a first side 712 and a second side 714. Each of the reflective slats 720a-1 is mounted to the two sides 712, 714 of the frame 710 by connecting arms that are coupled between opposite sides of the reflective slats 720a-1 and each of the sides 712, 714. For example, the first reflective slat 720a is mounted by a first connecting arm 722 and a second connecting arm 724. The first connecting arm 722 is connected to a mid-point of one end of the reflective slat 720a and the side 714 of the frame 710. The second connecting arm 724 is connected to a mid-point of the opposite end of the reflective slat 720a and the side 712 of the frame. Thus, the reflective slat 720a is suspended between the sides 712, 714 of the frame 710 by connecting arms 722, 724 connected to mid-points of opposite ends of the reflective slat 720a. In some examples, the connecting arms 722, 724 can be narrow strips that are integrally formed with the reflective slat 720a. Each of the reflective slats 720b-1 can also be mounted to the frame 710 by connecting arms connected to mid-points of opposite ends of the reflective slats 720b-1. The connecting arms twist to allow each of the reflective slats 720a-1 to rotate about an axis of rotation defined by the pairs of connecting arms.

The axes of rotation of the reflective slats 720a-1 defined by the respective pairs of connecting arms (e.g., the connecting arms 722, 724) are all situated in a common plane and oriented in parallel. The reflective slats 720a-1 are arranged in an array with a single row, and the axes of rotation of the reflective slats 720a-1 can be perpendicular to the direction of the row. The reflective slats 720a-1 can be oscillated about their respective axes of rotation to cause an incident pulse of light to be jointly reflected by the reflective slats 720a-1 and re-directed according to the instantaneous orientation of the reflective slats 720a-1. The moment of inertia of the individual reflective slats 720a-1 is relatively small compared to, for example, the moment of inertia of a single mirror with a reflective surface approximately equal to the cumulative reflective surfaces in the array of reflective slats 720. Moment of inertia is related to resonant frequency, with lower moments of inertia corresponding to higher resonant frequencies and vice versa. The array of reflective slats 720a-1 can therefore be driven to oscillate at a relatively higher frequency than a single mirror with a comparable cumulative reflective surface area.

In some embodiments, the reflective slats 720a-1 can be driven with an electromagnetic driving system of electromagnets situated underneath the array of reflective slats 720 to cause the reflective slats 720a-1 to oscillate in phase. For example, each of the reflective slats 720a-1 can be associated with a group of electromagnets arranged to apply torque on the reflective slat by magnetically attracting the reflective slat. Each reflective slat 720a-1 can have a mirror-associated set of electromagnets, and each mirror-associated set can be separately operated to cause the array of reflective slats 720 to oscillate in phase while accounting for variation in resonant frequencies among the reflective slats 720a-1.

In some embodiments, the array of reflective slats 720 can have an approximate height of 3 centimeters and an approximate width of 6 centimeters (e.g., each reflective slat can have dimensions of 3 centimeters by 0.5 centimeters). The beam-steering device 700 can be used to direct incident light pulses with a beam diameter of approximately 3 centimeters, for example.

In some examples, the beam-steering device 700 can be operated to oscillate the array of reflective slats 720, in phase, by about 2° (e.g., between +1° and −1°) and at a frequency of about 5 kilohertz. The beam-steering device 700 can thus be used to direct incident light pulses across a scanning region with an opening angle of about 2° with an angular scanning frequency of about 5 kilohertz, for example.

Figure 8A:
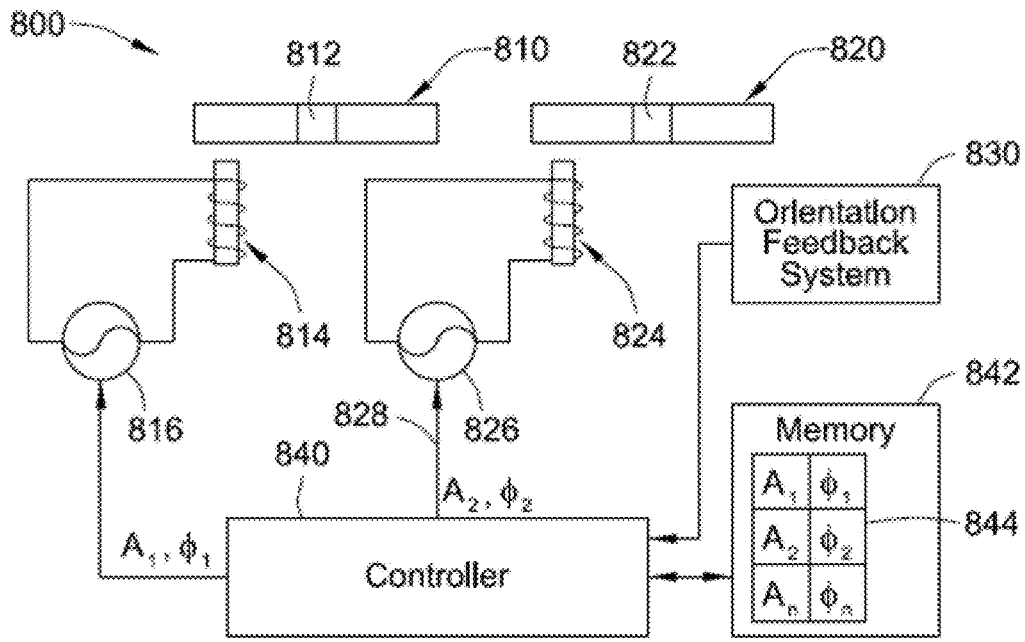
FIG. 8A is a block diagram of an electromagnetic driving system for a beam-steering device with multiple oscillating mirrors, according to an example embodiment.

FIG. 8A is a block diagram of an electromagnetic driving system 800 for an example beam-steering device with multiple oscillating mirrors 810, 820. The system 800 includes an orientation feedback system 830, a controller 840, and a memory 844. The controller 840 instructs an electromagnetic driving system to cause the mirrors 810, 820 to oscillate. The mirrors 810, 820 may be similar to the reflective slats discussed in connection with FIGS. 5 and 6 above, and may be part of an array of such reflective slats. For example, the electromagnetic driving system can include an electromagnet 814 (or multiple electromagnets)

associated with mirror 810 and an electromagnet 824 (or multiple electromagnets) associated with mirror 820. A first driving circuit 816 operates the electromagnet 814 according to input 818 from the controller 840, and a second driving circuit 826 operates the electromagnet 824 according to input 828 from the controller 840. The driving circuits 816, 826 can each generate driving signals, such as a sinusoidal alternating current or other time-varying current, to energize the respective electromagnets 814, 824 associated with each of the mirrors 810, 820. When driven, the electromagnets 814, 824 can cause the mirrors 810, 820 to oscillate about their respective axes of rotation (e.g., the axes of rotation defined by twisting the connecting arms 812, 822).

The orientation feedback system 830 can include detectors for sensing the position ("orientation") of the mirrors 810, 820 and providing information indicative of the positions to the controller 840. The controller 840 can analyze the information from the orientation feedback system 830 to identify phase differences and/or amplitude differences between the oscillatory motion of the different mirrors in the array. The controller 840 can then adjust the inputs 818, 828 supplied to driving circuits 816, 826 associated with the mirrors 810, 820 to account for the detected differences in phase and/or amplitude. For example, the inputs 818, 828 can include respective amplitude and phase information sufficient to cause the mirrors 810, 820 (and any additional mirrors in the array) to oscillate substantially in phase and with a substantially similar amplitude. Inputs 818 and 828 can include different amplitude and phase information to account for different characteristics of mirrors 810 and 820.

In this regard, even when driven with identical driving currents, the two mirrors 810, 820 may oscillate with a difference in phase and/or amplitude. The two mirrors 810, 820 may have different moments of inertia and/or resonant frequencies due to variations in dimensions, mass, axis alignment, and/or material stiffness, etc., of the mirrors 810, 820 and/or connecting arms 812, 822. Moreover, the placement of the electromagnets 814, 824 with respect to the mirrors 810, 820 can influence the efficacy of the magnetic attraction (i.e., the magnetic coupling) for a given driving current of the electromagnets 814, 824. In some examples, the moments of inertia, resonant frequency, and/or magnetic coupling of the two mirrors 810, 820 may differ due to manufacturing variations in dimensions, mass distribution, material stiffness, etc. among the mirrors 810, 820, the connecting arms 812, 822, and/or the electromagnets 814, 824.

Differences in moments of inertia and/or resonant frequencies result in phase offsets and/or amplitude variations in oscillatory motion between a group of harmonic oscillators driven with a common driving signal. For instance, for a torsional harmonic oscillator driven to oscillate at a driving frequency $f_{drive}$ by a sinusoidal driving force of the form:

$$F(t) = A_0 \sin(2\pi(f_{drive})t),$$

the angular orientation of the oscillator as a function of time is given by:

$$\theta(t) = A \sin(2\pi(f_{drive})t + \phi)$$

where A is the amplitude of the oscillatory motion and $\phi$ is a phase offset ("phase delay") between the driving force and the resulting oscillatory motion. Both the amplitude A and the phase offset $\phi$ can be dependent on one or more of the driving frequency, the moment of inertia of the oscillator, and the resonant frequency $f_{res}$ of the oscillator.

While the amplitude and phase delay may therefore be substantially unique according to characteristics of the oscillator (e.g., mass distribution, material stiffness, dimensions, axis orientation, etc.), some embodiments of the present disclosure present techniques for adjusting the amplitude and/or phase delay. In some examples, the phase offset of such a driven harmonic oscillator can be modified by adjusting the phase of the driving signal. The phase of the driving signal can then at least approximately add to the phase delay of the harmonic oscillator to provide a desired phase. Thus, the phase of the driving signal can be approximately added to the observed phase offset of a given harmonic oscillator to generate a predetermined phase of the resulting oscillatory motion.

In some examples, the amplitude of the oscillatory motion of such a driven harmonic oscillator can be modified by adjusting the amplitude of the driving force. The driving force amplitude adjustments may result in approximately proportionate adjustments in the amplitude of the oscillatory motion, particularly for a driving frequency that is not near the resonant frequency of the oscillator. Thus, the amplitude A of the oscillatory motion may be approximately proportionate to the amplitude $A_0$ of the driving force F(t). The phase delay of the oscillatory motion can also be modified by introducing a corresponding phase offset on the driving force. For example, where the driving force is changed to:

$$F_{adj}(t) = A_{adj} \sin(2\pi(f_{drive})t + \phi_{adj}),$$

the oscillatory motion of the oscillator can change to:

$$\theta(t) = (A_{adj}/A_0) A \sin(2\pi(f_{drive})t + \phi_{adj} + \phi).$$

The values of $A_{adj}$ and/or $\phi_{adj}$ may therefore be selected to achieve a predetermined amplitude and/or phase delay of the oscillatory motion. That is, once the values of A and $\phi$ are observed (or otherwise identified), the values of $A_{adj}$ and $\phi_{adj}$ can be selected to provide oscillatory motion with a desired amplitude and/or phase.

Some embodiments of the present disclosure therefore provide for the controller 840 to receive information from the orientation feedback system 830 indicating the orientations of the mirrors 810, 820. The mirror orientations may be sensed via optical detection systems, encoders, inductive proximity measurements, etc. The orientation feedback system 830 may include, for example, detecting distances between a portion of the mirrors 810, 820 and a fixed sensor (e.g., a proximity sensor). The controller 840 can then determine an amplitude and/or phase offset to apply to the driving signals of one or more of the electromagnets (e.g., the electromagnets 814, 824) in the electromagnetic driving system to cause the mirrors 810, 820 to oscillate in phase. For example, the controller 840 may determine an amplitude $A_1$ and phase $\phi_1$ to apply to the driving signals for the first mirror 810; an amplitude $A_2$ and phase $\phi_2$ to apply to the driving signals for the second mirror 820; and so on. The controller 840 can convey the amplitude and/or phase information for the first and second mirrors 810, 820 in inputs 818, 828 to the respective driving circuits 816, 826 for the electromagnets 814, 824. The driving circuits 816, 826 can then apply suitable currents to energize the electromagnets 814, 824 according to the amplitude and/or phase delay information (e.g., $A_1$, $\phi_1$, $A_2$, $\phi_2$, etc.) provided in the respective inputs 818, 828.

In some examples, a memory 842 in communication with the controller 840 can store indications of the driving parameters 844 for each mirror 810, 820. The indications of the driving parameters 844 are represented in FIG. 8A by a lookup table for purposes of illustration only. In some examples, the controller 840 may operate to intermittently update the driving parameters 844 stored in the memory 842.

In some examples, the controller 840 may determine new values for the driving parameters 844 based on real-time analysis of the information from the orientation feedback system 830.

To ease the computation burden between updates, the system 800 can continue to operate with the most recently determined driving parameters. For example, the driving parameters 844 may be updated at a frequency of 10 hertz, or another frequency that is less than the driving frequency. The controller 840 may be implemented as a proportional-integral-derivative (PID) controller, for example, that operates to periodically adjust the amplitudes and/or phases of the driving signals of each mirror 810, 820 based on information from the orientation feedback system 830.

Thus, the controller 840 can control the mirrors 810, 820 (and any additional mirrors in the array) to oscillate in a coordinated fashion so as to jointly steer incoming light pulses according to the common orientation of the mirrors 810, 820. In some embodiments, the mirrors 810, 820 (and any additional mirrors) can be driven to oscillate approximately in phase and with an approximately equal amplitude such that incoming pulses of light are scanned cross a scanning zone with an opening angle corresponding to the angular oscillations of the mirrors 810, 820 (i.e., the amplitude of the oscillatory motion).

Figure 8B:
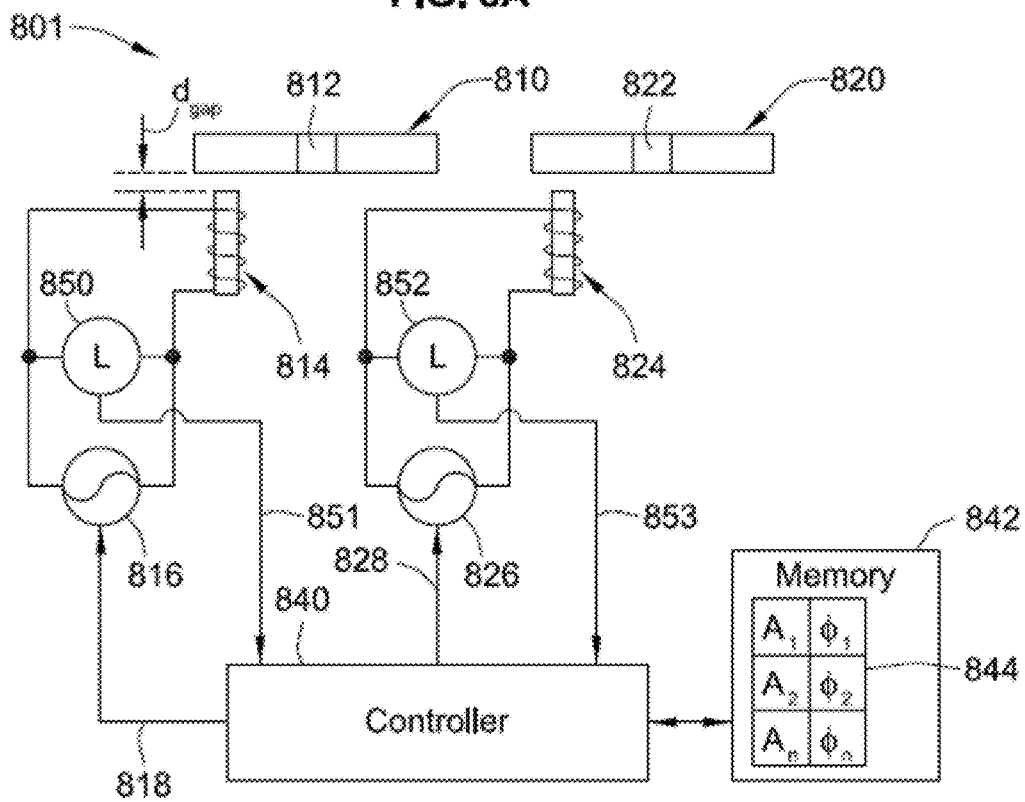
FIG. 8B is a block diagram of an electromagnetic driving system that includes inductance sensors to detect the orientations of multiple oscillating mirrors, according to an example embodiment.

FIG. 8B is a block diagram of an electromagnetic driving system 801 that includes inductance sensors 850, 852 to detect the orientation of the multiple oscillating mirrors 810, 820. The inductance sensors 850, 852 operate to measure the inductance of the the conductive coils of the electromagnets 814, 824. The inductance measurement can be used to determine the distance between the end of the electromagnets 814, 824 and the bottom side of the mirrors 810, 820 (e.g., the distance $d_{gap}$ between the end of the core of the electromagnet 814 and the bottom side of the mirror 810 as shown in FIG. 8B). In some examples, the inductance value is linearly proportional to the distance between the electromagnets 814, 824 and the mirrors 810, 820. The inductance sensors 850, 852 can therefore be used to sense the positions of the mirrors 810, 820 relative to the electromagnets 814, 824. Position information 851, 853 is output from the inductance sensors 850, 852 to the controller 840 and used to determine driving parameters for the mirrors 810, 820. The position information 851, 853 output from the inductance sensors 850, 852 may be, for example, inductance values, and the controller 840 may be configured to map the inductance values to orientations of the mirrors 810, 820 (e.g., according to look-up tables, calibration information, etc.). The inductance sensors 850, 852 on the electromagnets 814, 824 in the system 801 are one example of an orientation feedback system.

It is noted that the block diagrams in FIGS. 8A and 8B each include two mirrors 810, 820 and two electromagnets 814, 824, although this is for purposes of illustration and explanation only. In some embodiments, the functions of the controller 840 and/or orientation feedback system 830 may be applied to systems with an array of oscillating mirrors of arbitrary size and/or number. Moreover, each oscillating mirror in such an array may be driven by more than one electromagnet and may be driven by oscillatory systems other than an electromagnetic driving system. For example, each mirror in the array may be driven by four electromagnets associated with each mirror, similar to the arrangement described in connection with FIG. 5D above.

In addition, it is noted that the block diagrams in FIGS. 8A and 8B are not intended to illustrate the relative scale or dimensions of the various physical features, such as the mirrors 810, 820. For example, in some embodiments the mirrors 810, 820 may be spaced relative to one another at a minimum separation distance while still allowing for enough room for clearance while the two mirrors oscillate with respect to one another (and may also include enough room to account for manufacturing and/or engineering tolerances). In particular, minimizing the separation distance between adjacent ones of the oscillating mirrors (e.g., the mirrors 810, 820) allows for the total combined reflective surface area of the array of mirrors to be maximized.

Figure 9A:
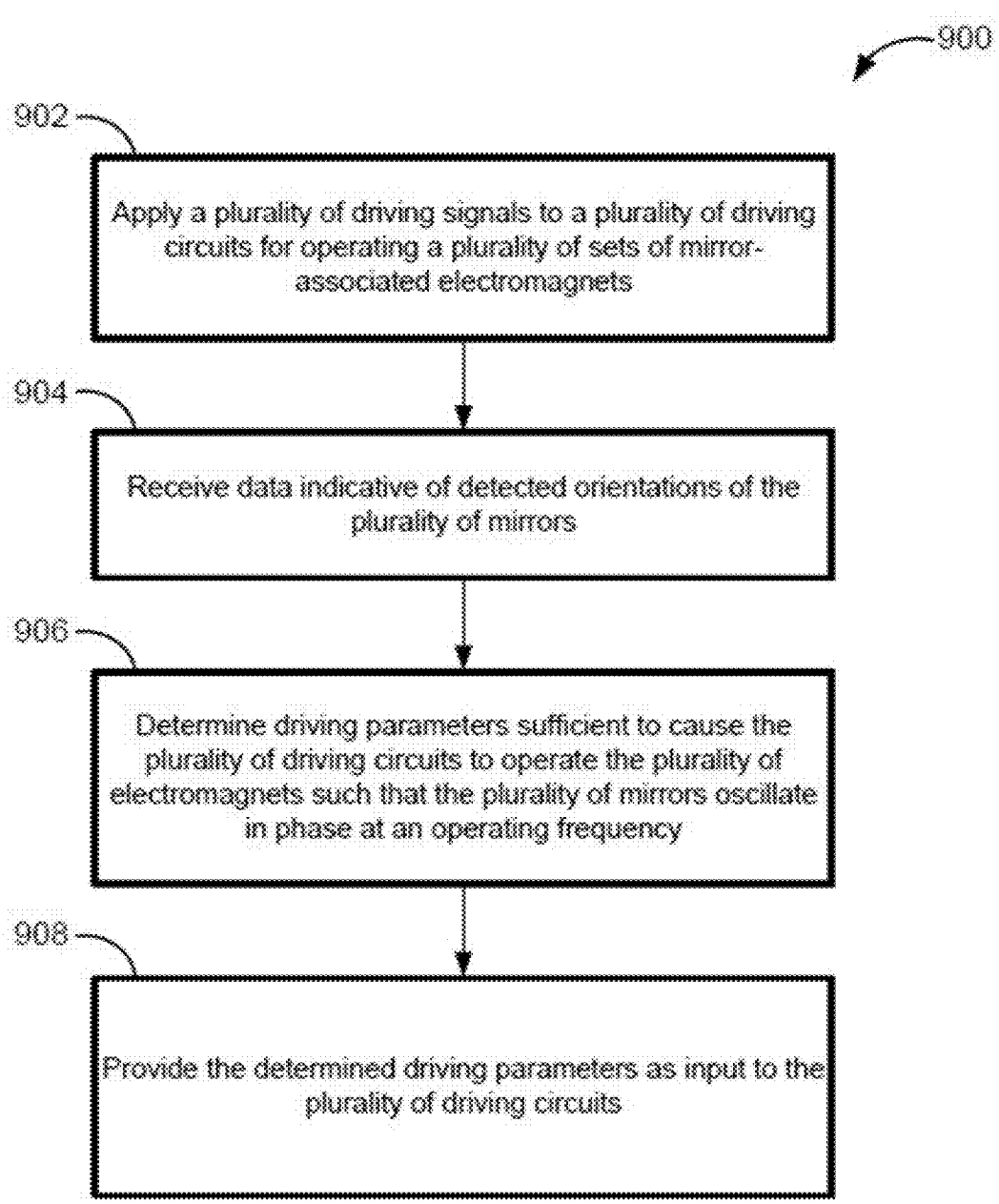
FIG. 9A is a flowchart of a process for operating a beam-steering device with multiple oscillating mirrors according to an example embodiment.

FIG. 9A is a flowchart of a process 900 for operating a beam-steering device with multiple oscillating mirrors according to an example embodiment. Sets of electromagnets can be associated with each of the oscillating mirrors for operating each of the mirrors. Each set of mirror-associated electromagnets can be operated by a respective driving circuit based on respective input (902). Data indicative of detected orientations of the mirrors can be received (904). For example, orientation information can be received from an orientation feedback system. Driving parameters sufficient to cause the driving circuits to operate the electromagnets such that the mirrors oscillate in phase at an operating frequency can be determined (906). For example, a controller can analyze the orientation information received in block 904 to determine phases and/or amplitudes of driving signals to apply to the electromagnets to cause the mirrors to oscillate in phase. The determined driving parameters can be provided as inputs to the driving circuits (908).

Figure 9B:
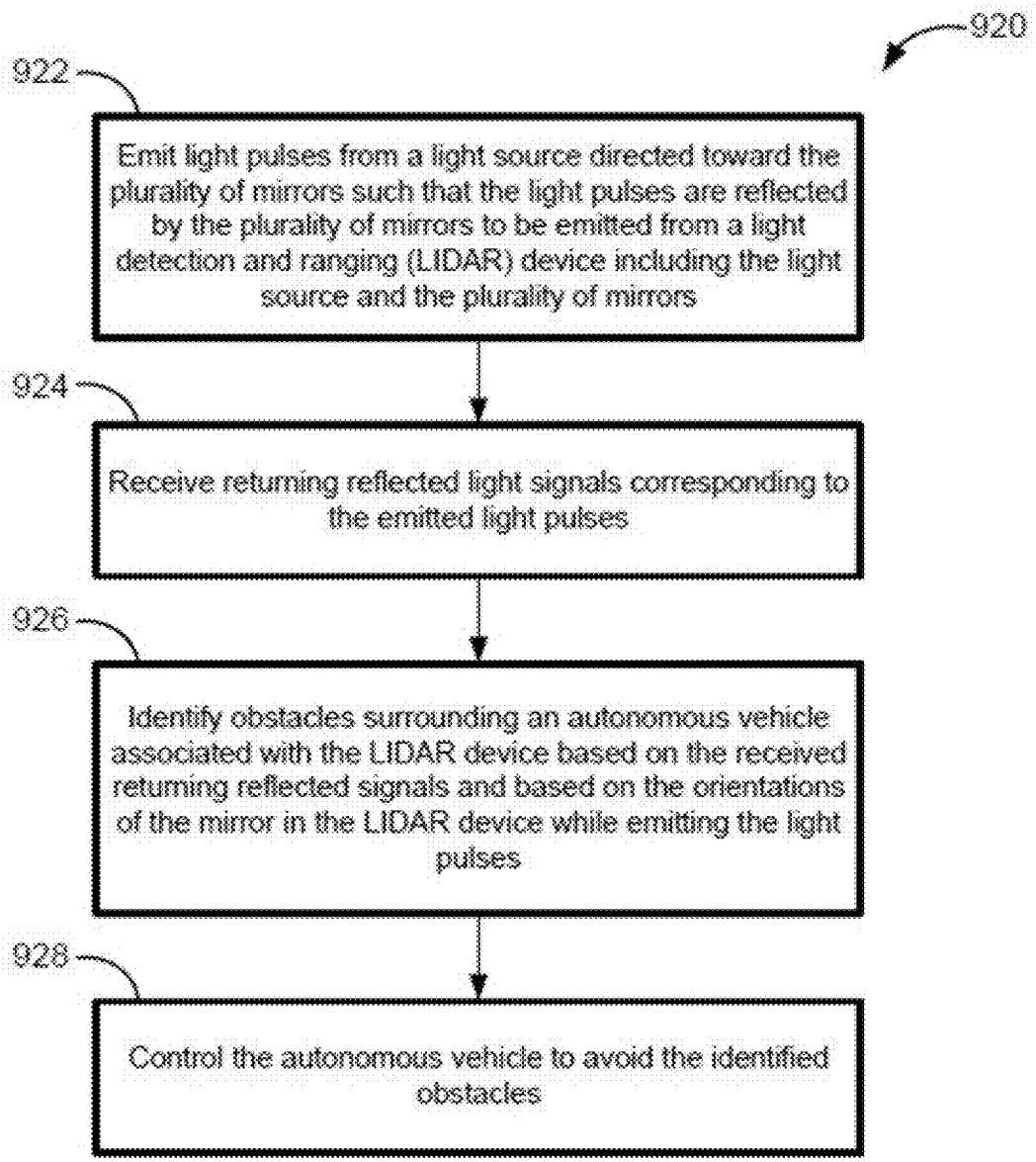
FIG. 9B is a flowchart of a process for operating a LIDAR device according to an example embodiment.

FIG. 9B is a flowchart of a process 920 for operating a light detection and ranging (LIDAR) device according to an example embodiment. The LIDAR device can include a light source and a plurality of mirrors. Pulses of light can be emitted from the light source toward the plurality of mirrors to be emitted from the LIDAR device (922). The pulses of light may be reflected by the plurality of mirrors to scan across a scanning zone, for example. The light pulses can be reflected by, for example, an array of mirrors oscillating in phase at an operating frequency to jointly reflect incident light pulses according to the orientation of the mirrors in the array. The plurality of mirrors may be operated according to the process 900 described in connection with FIG. 9A above. Returning reflected light signals corresponding to the emitted light pulses can be received (924). Obstacles in the scanning zone can be identified based on the returning reflected signals and based on orientations of the plurality of mirrors in the LIDAR device at the time the pulses of light were emitted (926). The orientation of the mirrors in the LIDAR device can be, for example, the orientation of an array of mirrors. An autonomous vehicle associated with the LIDAR device can then be controlled to avoid the identified obstacles (928). The autonomous vehicle may be controlled, for example, by the navigation/pathing system 142 and/or obstacle avoidance system 144 discussed in connection with the autonomous vehicle 100 of FIG. 1.

FIGS. 9A and 9B present flowcharts describing processes employed separately or in combination in some embodiments of the present disclosure. The methods and processes described herein are generally described by way of example as being carried out by an autonomous vehicle, such as the autonomous vehicles 100, 200 described above in connection with FIGS. 1 and 2. For example, the processes described herein can be carried out by the LIDAR sensor 128 mounted to an autonomous vehicle in communication with the computer system 112, sensor fusion algorithm module 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in the computer system 112) for achieving specific logical functions, determinations, and/or steps described in connection with the flowcharts. Where used, program code can be stored on any type of computer readable medium (e.g., computer readable storage medium or non-transitory media, such as data storage 114 described above with respect to computer system 112), for example, such as a storage device including a disk or hard drive. In addition, each block of the flowcharts can represent circuitry that is wired to perform the specific logical functions in the process. Unless specifically indicated, functions in the flowcharts can be executed out of order from that shown or discussed, including substantially concurrent execution of separately described functions, or even in reverse order in some examples, depending on the functionality involved, so long as the overall functionality of the described method is maintained. Furthermore, similar combinations of hardware and/or software elements can be employed to implement the methods described in connection with other flowcharts provided in the present disclosure.

As used herein a "scanning zone" generally refers to a region of a scanned environment scanned by a single LIDAR device, or a combination of LIDAR devices, that is completely sampled in a complete scan by the LIDAR device. That is, for a LIDAR device operated to continuously actively map its surroundings for reflective features, the scanning zone is the complete region mapped before returning to map the same point again. Generally, the scanning zone referred to herein is defined with reference to the point of view of the LIDAR device in terms of azimuth (e.g., angle along the horizon) and altitude (e.g., angle perpendicular to the horizon) with respect to the point of view of the LIDAR device. Thus, the geographic location mapped by the scanning zone of a LIDAR device is not fixed, but rather moves with the LIDAR device. For example, the scanning zone can be considered a bubble (or cone-shaped region, etc.) surrounding a particular LIDAR device with dimensions defined by the maximum distance sensitivity of the LIDAR device.

Figure 10:
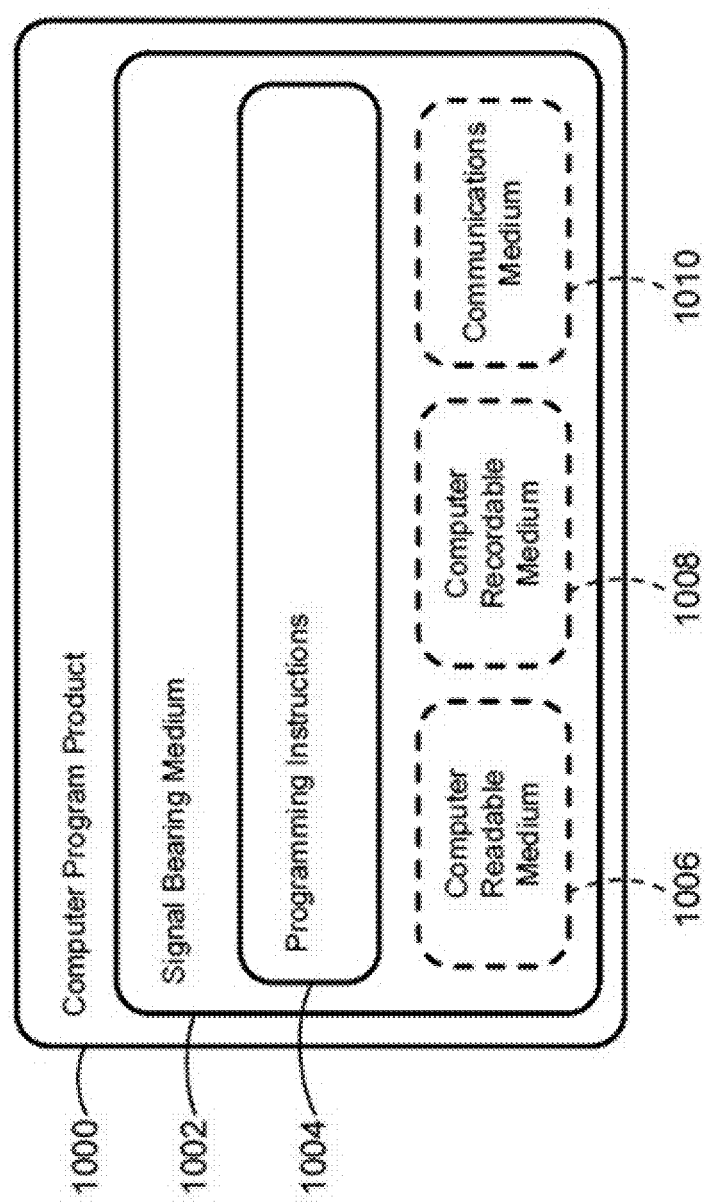
FIG. 10 depicts a non-transitory computer-readable medium configured according to an example embodiment.

FIG. 10 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above, such as the processes discussed in connection with FIGS. 9A and 9B above.

As noted above, in some embodiments, the disclosed techniques can be implemented by computer program instructions encoded on a non-transitory computer-readable storage media in a machine-readable format, or on other non-transitory media or articles of manufacture (e.g., the instructions 115 stored on the data storage 114 of the computer system 112 of vehicle 100 and/or instructions executed by the controller 316 of the LIDAR system 300). FIG. 10 is a schematic illustrating a conceptual partial view of an example computer program product 1000 that includes a computer program for executing a computer process on a computing device, arranged according to at least some embodiments presented herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 can be a non-transitory computer-readable medium 1006, such as, but not limited to, a hard disk drive, a Compact Disc (CD), a Digital Video Disk (DVD), a digital tape, memory, etc. In some implementations, the signal bearing medium 802 can be a computer recordable medium 1008, such as, but not limited to, memory, read/write (R/W) CDs, R/W DVDs, etc. In some implementations, the signal bearing medium 1002 can be a communications medium 1010, such as, but not limited to, a digital and/or an analog communication medium (e.g., a fiber optic cable, a waveguide, a wired communications link, a wireless communication link, etc.). Thus, for example, the signal bearing medium 1002 can be conveyed by a wireless form of the communications medium 1010.

The one or more programming instructions 1004 can be, for example, computer executable and/or logic implemented instructions. In some examples, a computing device such as the computer system 112 of FIG. 1 is configured to provide various operations, functions, or actions in response to the programming instructions 1004 conveyed to the computer system 112 by one or more of the computer readable medium 1006, the computer recordable medium 1008, and/or the communications medium 1010.

The non-transitory computer readable medium could also be distributed among multiple data storage elements, which could be remotely located from each other. The computing device that executes some or all of the stored instructions could be a vehicle, such as the vehicle 200 illustrated in FIG. 2. Alternatively, the computing device that executes some or all of the stored instructions could be another computing device, such as a server.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A light detection and ranging (LIDAR) device comprising:
    a plurality of mirrors arranged to rotate about respective axes of rotation;
    a plurality of electromagnets arranged to attract the plurality of mirrors so as to apply torque on the respective mirrors about their respective axes of rotation;
    a plurality of driving circuits for operating the plurality of electromagnets using a plurality of driving signals;
    a plurality of detectors configured to detect orientations of the plurality of mirrors;
    a controller configured to: (i) receive data from the plurality of detectors indicative of detected orientations of the plurality of mirrors, and (ii) based on the detected orientations, control the plurality of driving circuits to operate the plurality of electromagnets such that the plurality of mirrors oscillate in phase at an operating frequency; and
    a light source configured to emit light pulses directed toward the plurality of mirrors such that the light pulses are reflected by the plurality of mirrors.

2. The LIDAR device according to claim 1, further comprising:
a housing for mounting the plurality of mirrors via respective pairs of connecting arms connected between the housing and respective midpoints of opposing sides of each mirror, wherein the respective pairs of connecting arms are configured to twist during rotation of the respective mirrors so as to define the respective axes of rotation of the respective mirrors.

3. The LIDAR device according to claim 2, wherein the connecting arms are configured to resist twisting and thereby bias the mirrors in a non-rotated orientation.

4. The LIDAR device according to claim 2, wherein the connecting arms are integrally formed with respective ones of the plurality of mirrors.

5. The LIDAR device according to claim 1, wherein the plurality of detectors include a plurality of impedance sensors, wherein each impedance sensor is configured to detect impedance in a respective mirror-associated set of electromagnets.

6. The LIDAR device according to claim 1, wherein the plurality of detectors include a plurality of optical sensors, wherein each optical sensor is configured to detect light reflected from a respective mirror in the plurality of mirrors.

7. The LIDAR device according to claim 1, further comprising:
a substrate proximate back surfaces opposite respective reflective surfaces of the plurality of mirrors, and
wherein the plurality of electromagnets each include:
a central core formed by a ferromagnetic peg extending outward from the substrate substantially perpendicular to the back surfaces, and
a coil formed by conductive traces embedded in the substrate that wrap around the peg such that a current driven through the coil magnetizes the peg.

8. The LIDAR device according to claim 7, wherein the plurality of electromagnets are arranged in pairs such that each pair of pegs has ends distal from the substrate located approximately equidistant from the axis of rotation of a respective one of the plurality of mirrors.

9. The LIDAR device according to claim 1, wherein each of the plurality of mirrors has a length dimension and a perpendicular width dimension shorter than the length dimension, and wherein the axis of rotation is oriented parallel to the length dimension of the reflective surface.

10. The LIDAR device according to claim 1, wherein each of the plurality of driving signals is configured to provide a respective alternating current through a respective one of the electromagnets based on respective driving parameters provided by the controller.

11. The LIDAR device according to claim 10, wherein the driving parameters define at least one of a respective phase or respective amplitude for each respective alternating current.

12. The LIDAR device according to claim 1, wherein the operating frequency is approximately 5 kilohertz.

13. The LIDAR device according to claim 1, wherein the plurality of mirrors are configured such that each oscillates through a range of orientations of approximately 2 degrees.

14. The LIDAR device according to claim 1, wherein each mirror in the plurality of mirrors comprises a ferromagnetic material.

15. The LIDAR device according to claim 1, wherein the LIDAR device is associated with an autonomous vehicle that is configured to use returning reflected signals corresponding to the emitted light pulses to identify obstacles surrounding the autonomous vehicle and then control the autonomous vehicle to avoid the detected obstacles.

16. A method comprising:
operating a plurality of sets of mirror-associated electromagnets in a LIDAR device such that each set of mirror-associated electromagnets is operated by a respective driving circuit in a plurality of driving circuits in the LIDAR device, wherein each set of mirror-associated electromagnets is configured to apply torque to a respective mirror in a plurality of mirrors in the LIDAR device so as to cause the respective mirror to rotate about a respective axis of rotation;
receiving by a controller in the LIDAR device, from a plurality of detectors configured to detect orientations of the plurality of mirrors, data indicative of detected orientations of the plurality of mirrors; and
controlling by the controller, based on the detected orientations, the plurality of driving circuits to operate the plurality of electromagnets such that the plurality of mirrors oscillate in phase at an operating frequency.

17. The method according to claim 16, wherein each driving circuit provides a respective alternating current through a respective one of the sets of mirror-associated electromagnets based on respective driving parameters provided by the controller, wherein the driving parameters define at least one of a respective phase or respective amplitude for each respective alternating current.

18. The method according to claim 16, further comprising:
emitting light pulses directed toward the plurality of mirrors such that the light pulses are reflected by the plurality of mirrors;
detecting returning reflected light signals corresponding to the emitted light pulses;
identifying obstacles surrounding an autonomous vehicle; and
controlling the autonomous vehicle to avoid the identified obstacles.

19. A non-transitory computer readable medium storing instructions that, when executed by one or more processors in a computing device, cause the computing device to perform operations, the operations comprising:
operating a plurality of sets of mirror-associated electromagnets in a LIDAR device such that each set of mirror-associated electromagnets is operated by a respective driving circuit in a plurality of driving circuits in the LIDAR device, wherein each set of mirror-associated electromagnets is configured to apply torque to a respective mirror in a plurality of mirrors in the LIDAR device so as to cause the respective mirror to rotate about a respective axis of rotation;
receiving, from a plurality of detectors configured to detect orientations of the plurality of mirrors, data indicative of detected orientations of the plurality of mirrors; and
based on the detected orientations, controlling the plurality of driving circuits to operate the plurality of electromagnets such that the plurality of mirrors oscillate in phase at an operating frequency.

20. The non-transitory computer readable medium according to claim 19, wherein the operations further comprise:
emitting light pulses directed toward the plurality of mirrors such that the light pulses are reflected by the plurality of mirrors;
detecting returning reflected light signals corresponding to the emitted light pulses;

identifying obstacles surrounding an autonomous vehicle; and controlling the autonomous vehicle to avoid the identified obstacles.

* * * * *